US008637828B2

(12) United States Patent
Okada

(10) Patent No.: US 8,637,828 B2
(45) Date of Patent: Jan. 28, 2014

(54) RADIATION DETECTION ELEMENT

(75) Inventor: Yoshihiro Okada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 488 days.

(21) Appl. No.: 12/979,168

(22) Filed: Dec. 27, 2010

(65) Prior Publication Data

US 2011/0186742 A1 Aug. 4, 2011

(30) Foreign Application Priority Data

Jan. 29, 2010 (JP) ................................. 2010-019406

(51) Int. Cl.
*H01L 27/146* (2006.01)
(52) U.S. Cl.
USPC ......................................... 250/370.08; 438/4
(58) Field of Classification Search
USPC ......................................... 250/370.08; 438/4
See application file for complete search history.

(56) References Cited

U.S. PATENT DOCUMENTS 5,976,978 A * 11/1999 Salisbury ...................... 438/690
2008/0210946 A1* 9/2008 Okada et al. .................... 257/71

FOREIGN PATENT DOCUMENTS

| JP | 11-233746 A | 8/1999 |
| JP | 2002-009272 A | 1/2002 |
| JP | 2008-505496 A | 2/2008 |
| JP | 4311693 B2 | 8/2009 |

* cited by examiner

*Primary Examiner* — David Porta
*Assistant Examiner* — Shun Lee
(74) *Attorney, Agent, or Firm* — Sughrue Mion, PLLC

(57) ABSTRACT

The present invention provides a radiation detection element that allows repairing of a defect portion, and that minimizes the number of pixels from which charges cannot be read out when repaired. Namely, in two adjacent pixels that are connected to a signal line having a defect portion where a defect has occurred and that are adjacent to the defect portion, the signal lines and the parallel lines are short-circuited to configure a parallel circuit parallel to the defect portion.

7 Claims, 19 Drawing Sheets

RADIATION DETECTION ELEMENT

CROSS-REFERENCE TO RELATED APPLICATION

This application claims priority under 35 USC 119 from Japanese Patent Application No. 2010-019406, filed on Jan. 29, 2010 the disclosure of which is incorporated by reference herein.

BACKGROUND OF THE PRESENT INVENTION

1. Field of the Invention

The present invention relates to a radiation detection element. In particular, the present invention relates to repairing of a defective pixel in a radiation detection element.

2. Description of the Related Art

Recently, radiographic detection elements such as a FPD (flat panel detector), or the like have been put into practice. Such radiographic detection elements have an X-ray sensitive layer disposed on a TFT (Thin Film Transistor) active matrix substrate, and are able to directly convert X-ray information into digital data. Such FPDs have the merit that, in comparison to with previous imaging plates, images can be more immediately checked and video images can also be checked. Consequently, the introduction of FPDs is proceeding rapidly. Various types are proposed for such radiographic detection elements. There are, for example, direct-conversion-type radiographic detection elements that convert radiation directly to charge in a semiconductor layer, and accumulate the charge. There are also indirect-conversion-type radiographic detection elements that first convert radiation into light with a scintillator, such as CsI:Tl, GOS ($Gd_2O_2S$:Tb) or the like, then convert the converted light into charge in a semiconductor layer and accumulate the charge.

In the radiation detection element, for example, plural scan lines and plural signal lines are arranged to intersect with each other. Further, in the radiation detection element, pixels each including a charge storage capacitor and a switching element such as a TFT switch are provided in a matrix at intersections of the scan lines and the signal lines.

In a radiation imaging device using the radiation detection element, when a radiation image is imaged, during irradiation of X-rays, an OFF signal is output to each scan line and each switching element is turned OFF. As a result, charges that are generated in a semiconductor layer are accumulated in each charge storage section. When an image is read out, the radiation imaging device sequentially outputs an ON signal to each scan line and reads out the charges that have been accumulated in the charge storage section in each pixel as an electric signal. By converting the read electric signal into digital data, the radiation imaging device obtains a radiation image.

The radiation detection element is formed by depositing various materials on an insulating substrate, and performing individual processes, such as resist coating, exposing, developing, etching, and resist removing.

In a manufacturing process of the radiation detection element, a defect such as a leak or disconnection of line may occur.

As a technology for repairing such defect, Japanese Patent No. 4311693 discloses a technology of electrically isolating a defected pixel. According to this technology, a portion of a line of the switching element is cut by irradiation of laser light to a switching element of the pixel with a defect.

Further, Japanese Patent Application Laid-Open (JP-A) No. 2002-9272 discloses a technology for cutting intersecting portions of a cut signal line and other lines. According to this technology, since laser repairing is performed and a signal line (referred to also as "signal transmission line") with a defect is electrically isolated from a read circuit, influence to adjacent pixels due to the potential change in the signal line which has been subject to repairing can be suppressed.

JP-A No. 11-233746 discloses a technology for connecting a signal line by welding a defective signal line and bypassing a disconnected portion. JP-A No. 11-233746 also discloses a radiation detection element that has an array of plural pixels arranged in rows and columns, plural scan lines provided along the rows, plural signal lines (also referred to as "data lines") provided along the columns, and common electrode lines provided parallel to the signal lines. In this radiation detection element, when the signal lines are disconnected, two scan lines and common electrode lines with the disconnection portions therebetween are connected, and a repairing parallel path is formed. According to this technology, the two scan lines and common electrode lines that are used for the repairing parallel path are cut at portions that do not function as the repairing parallel path, to prevent other signals from being input to the repairing parallel path.

By using the technology disclosed in Japanese Patent No. 4311693, a defective pixel may be isolated when a pixel has a defect. However, this technology is not effective when a line defect occurs.

In the technology disclosed in JP-A No. 2002-9272, the intersecting portions of the cut signal line and other lines are also cut. Therefore, in this technology, reading out the charges from all of the pixels that are connected to the cut signal line cannot be preformed, which results to a line defect.

In the technology disclosed in JP-A No. 11-233746, since the repairing parallel path is formed, the two scan lines with the disconnection portions therebetween may be cut. Accordingly, in this technology, the charges of the pixels associated with the cutting portions of the two scan lines can not be read out.

SUMMARY OF THE PRESENT INVENTION

The present invention provides a radiation detection element that allows repairing of a defect portion, and that minimizes the number of pixels from which charges cannot be read out when repaired.

A first aspect of the present invention is a radiation detection element including: a plurality of pixels, disposed in a matrix along a first direction and a second direction intersecting the first direction, that accumulate charges generated due to irradiation of radiation, and that include switching elements for reading out the accumulated charges; a plurality of signal lines, connected to the switching elements, and through which the charges that have been accumulated in the pixels flow according to switching states of the switching elements; and a plurality of parallel lines, provided parallel to the plurality of signal lines, wherein, in a plurality of adjacent pixels that are connected to a signal line having a defect portion where a defect has occurred and that are adjacent to the defect portion, the signal lines and the parallel lines are short-circuited to configure a parallel circuit parallel to the defect portion.

In the radiation detection element of the present invention, the plural pixels are arranged in a matrix, along a first direction and a second direction intersecting the first direction. Each pixel includes a switching element that is configured readout the accumulated charges generated due to irradiation of radiation. The signal lines are provided for each pixel line arranged in one direction in a matrix of pixels. The signal line is connected to the switching elements provided in the pixels of each pixel line. The signal line is supplied with charges that have been accumulated in the pixel according to a switching state of the switching element. In the radiation detection element of the present invention, the parallel lines are provided in parallel with the signal lines.

Further, in the radiation detection element of the present invention, a parallel circuit that is parallel to the defect portion is formed by short-circuiting the signal lines, and the parallel lines in the plural pixels that are at both sides of a defect portion, and are connected to the signal line having the defect portion where a defect has occurred.

Accordingly, in the radiation detection element according to the first aspect of the present invention, the defect portion may be repaired by the parallel circuit, and the signal line isolated due to the defect may be connected by the parallel circuit. Therefore, in the radiation detection element of the present invention, the number of pixels from which charges cannot be read out when repaired may be minimized.

A second aspect of the present invention, in the first aspect, the plurality of adjacent pixels may be two pixels that are adjacent on both sides of the defect portion.

A third aspect of the present invention, in the above aspect, the plurality of parallel lines may be provided to commonly apply a predetermine voltage to each pixel in each pixel line along the first direction, and the parallel lines that configure the parallel circuit may be cut at both sides of a portion that functions as the parallel circuit.

A fourth aspect of the present invention, in the above aspects, may further include: a plurality of scan lines, connected to the switching elements, and through which control signals for switching the switching elements flow, wherein, in the plurality of adjacent pixels, the switching elements and the scan lines may be cut.

A fifth aspect of the present invention, in the fourth aspect, when the defect is a leak between the scan line and the signal line, the signal line may be cut at a portion between a leak portion of the signal line where the leak has occurred and the switching elements of the plurality of adjacent pixels.

A sixth aspect of the present invention, in the above aspects, each pixel may include a storage capacitor that has one electrode connected the parallel line and the other electrode connected to the switching element and that accumulates the generated charges, and in the plurality of adjacent pixels, the switching elements and the storage capacitors may be short-circuited.

A seventh aspect of the present invention, in the above aspects, each pixel may include a sensor section, that is connected to the parallel line, that has applied thereto a predetermined bias voltage from the parallel line, and that generates charges due to irradiation of radiation, and in the plurality of adjacent pixels, the switching elements and the sensor sections may be short-circuited.

An eighth aspect of the present invention, in the above aspects, the pixels may be configured such that the parallel line and an electrode of the switching element or at least a portion of a conductive portion connected to the electrode overlap with only an insulating film therebetween.

According to the above aspects of the present invention, a defect portion may be repaired, while the number of pixels from which charges cannot be read out when repaired may be minimized.

BRIEF DESCRIPTION OF THE DRAWINGS

Exemplary embodiments of the present invention will be described in detail based on the following figures, wherein.

DETAILED DESCRIPTION OF THE PRESENT INVENTION

Hereinafter, exemplary embodiments of the present invention will be described with reference to the drawings. A case where the present invention is applied to a radiation imaging device 100 will be described.

First Exemplary Embodiment

Figure 1:
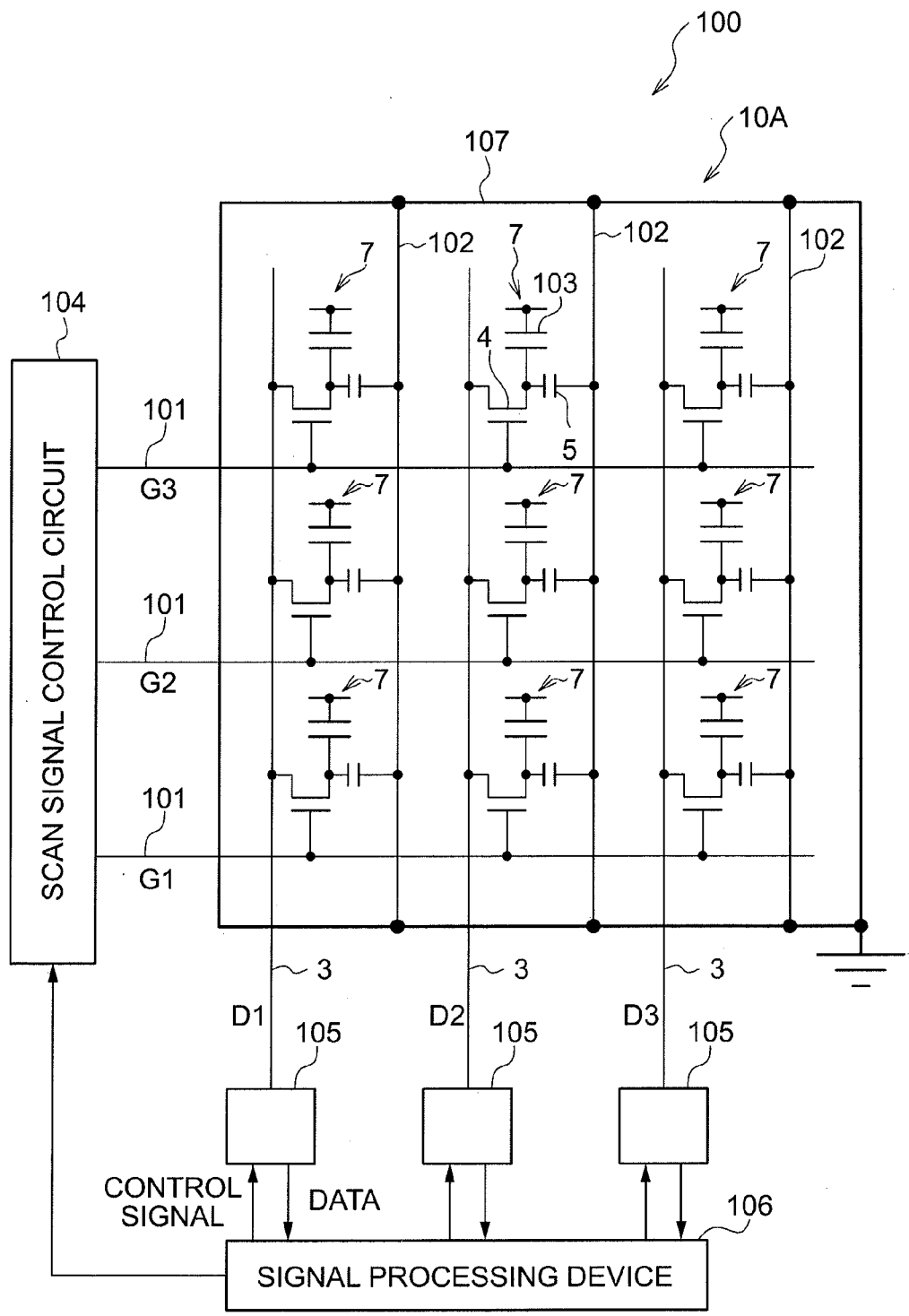
FIG. 1 is a diagram showing the entire configuration of a radiation imaging device according to a first exemplary embodiment of the present invention.

FIG. 1 shows the entire configuration of the radiation imaging device 100 according to the present exemplary embodiment.

As shown in FIG. 1, the radiation imaging device 100 according to the present exemplary embodiment includes a radiation detection element 10A of a direct-conversion-type that directly converts radiation into charges.

In the radiation detection element 10A, plural pixels 7 are provided in a matrix, along a first direction (horizontal direction of FIG. 1; hereinafter, also referred to as "row direction") and a second direction (vertical direction of FIG. 1; hereinafter, also referred to "column direction") intersecting the first direction. Each of the pixel 7 is configured to include a sensor section 103, a charge storage capacitor 5, and a TFT switch 4. The sensor section 103 receives irradiated radiation and generates charges. The charge storage capacitor 5 accumulates the charges that are generated by the sensor section 103. The TFT switch 4 reads out the charges that have accumulated in the charge storage capacitor 5.

In the radiation detection element 10A, plural scan lines 101 for turning ON/OFF the TFT switch 4 are provided in the row direction. In the radiation detection element 10A, plural signal lines 3 for reading out the charges that have accumulated in the charge storage capacitor 5 are provided in the column direction. A storage capacitor line 102 is provided for each signal line 3. In the radiation detection element 10A, lines 107 that are connected to a ground are provided to surround a detection region where the pixels 7 are provided in a matrix. Both ends of the storage capacitor line 102 are connected to the lines 107. One electrode of the charge storage capacitor 5 is connected to the storage capacitor line 102. The above-described one electrode of the chare storage capacitor 5 is connected to a ground via the storage capacitor line 102 and the line 107 and its voltage level is set to a ground level.

An electrical signal corresponding to the accumulated charge amount flows in each of the signal lines 3 by the TFT switch 4 being switched ON in one or other of the pixels 7 connected to this signal line 3. A signal detection circuit 105 is connected to the signal lines 3 for detecting the electrical signal flowing out from each of the signal lines 3. A scan signal control device 104 is also connected to the scan lines 101 for outputting a control signal for ON/OFF switching of the TFT switches 4 of each of the scan lines 101.

The signal detection circuit 105 includes an amplifier circuit that amplifies input electrical signals, for each of the respective signal lines 3. In the signal detecting circuit 105, the electric signal that is input from each signal line 3 is amplified by the amplifying circuit, and is detected. The signal detection circuit 105 thereby detects the charge amount that has been accumulated in each of charge storage capacitor 5 as data (image data) for each pixel configuring an image.

A signal processing device 106 is connected to the signal detecting circuit 105 and the scan signal control device 104. The signal processing device 106 executes predetermined processing on the electric signal detected by the signal detecting circuit 105. In addition, the signal processing device 106 outputs a control signal indicating signal detection timing to the signal detecting circuit 105 and outputs a control signal indicating output timing of a scan signal to the scan signal control device 104.

Figure 2:
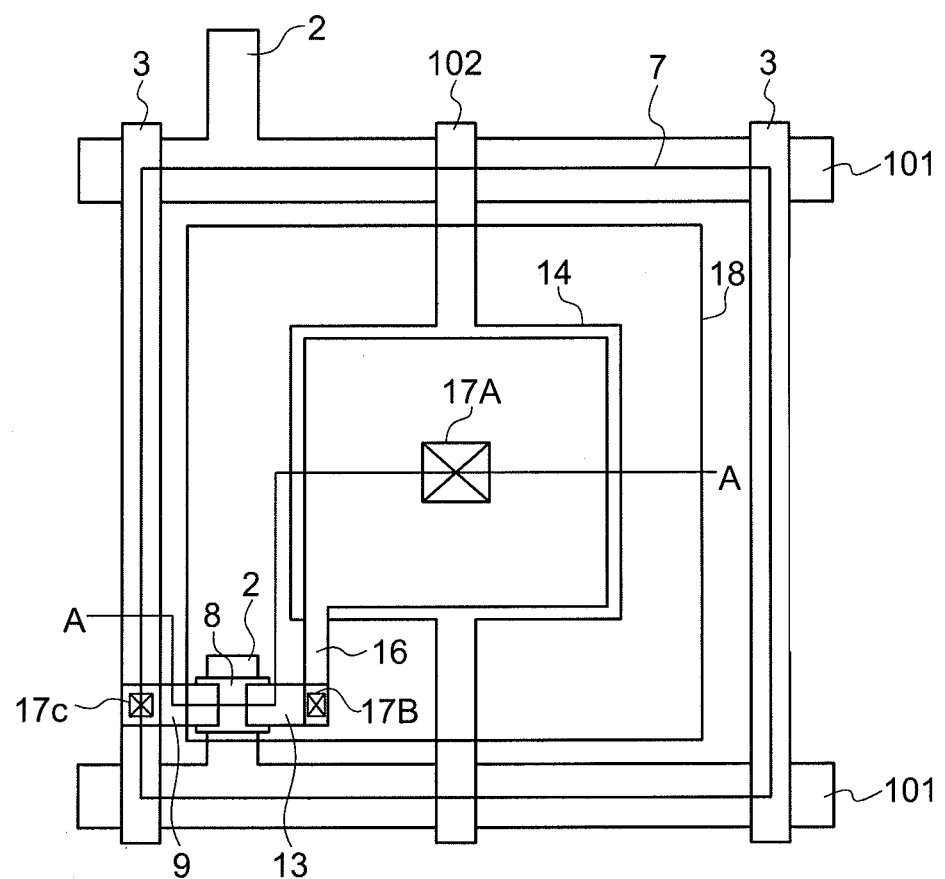
FIG. 2 is a diagram showing the configuration of each pixel of a radiation detection element according to the first exemplary embodiment.
Figure 3:
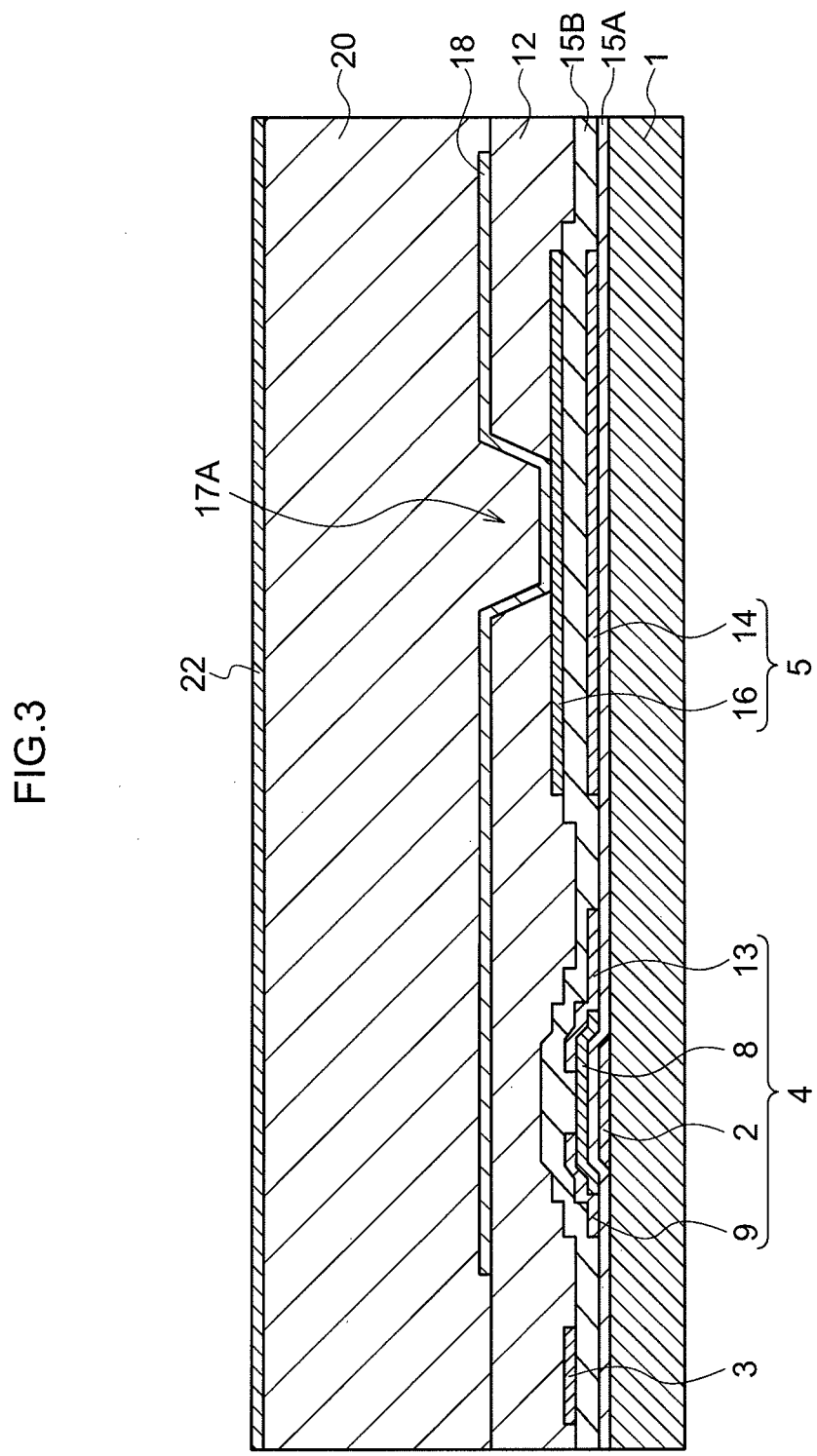
FIG. 3 is a cross-sectional view showing the sectional configuration of the line A-A of the radiation detection element of FIG. 2.

FIG. 2 and FIG. 3 show an example of the configuration of the radiation detection element 10A according to the present exemplary embodiment. FIG. 2 is a plan view showing the structure of each pixel 7 of the radiation detection element 10A according to the present exemplary embodiment. FIG. 3 is a cross-sectional view taken along the line A-A of FIG. 2.

As shown in FIG. 3, the radiation detection element 10A is formed with an insulating substrate 1 configured from alkali-free glass or the like, on which the scan lines 101 (FIG. 2) and gate electrodes 2 are formed. The gate electrodes 2 are connected to the scan lines 101. The wiring layer in which this scan lines 101 and gate electrodes 2 are formed (this wiring layer is referred to below as "the first signal wiring layer") is formed from Al and/or Cu, or a layered film mainly composed of Al and/or Cu.

A first insulation film 15A is formed on one face of the first signal wiring layer. The locations of the first insulation film 15A positioned over the gate electrodes 2 are employed as a gate insulation film in the TFT switches 4. The first insulation film 15A is, for example, formed from $SiN_x$ or the like by, for example, Chemical Vapor Deposition (CVD) film forming.

At the position that corresponds to the gate electrode 2 above the first insulating film 15A, a semiconductor active layer 8 is formed. The semiconductor active layer 8 is a channel portion of the TFT switch 4 and is, for example, foamed from an amorphous silicon film.

A source electrode 9 and a drain electrode 13 are formed on the layers mentioned above. The wiring layer in which the source electrode 9 and the drain electrode 13 are formed, a storage capacitor lower electrode 14 and a storage capacitor line 102 (refer to FIG. 2) are formed. The storage capacitor line 102 is connected to the storage capacitor lower electrodes 14 of the charge storage capacitors 5 provided in the pixels 7 of a pixel line, for each of pixel lines arranged in the column direction. The wiring layer in which the source electrodes 9, the drain electrodes 13, the storage capacitor lower electrodes 14, and the storage capacitor lines 102 are formed (this wiring layer is referred to below as "the second signal wiring layer") is formed from Al and/or Cu, or a layered film mainly composed of Al and/or Cu.

A second insulating film 15B is formed on one surface of the second wiring layer. The second insulating film 15B is, for example, formed from $SiN_x$ or the like by, for example, Chemical Vapor Deposition (CVD) film forming.

The signal lines 3 are formed on the layers mentioned above. At a position corresponding to the storage capacitor lower electrode 14 above the second insulating film 15B, a storage capacitor upper electrode 16 is formed. A wiring layer in which the signal lines 13 and the storage capacitor upper electrodes 16 are formed (hereinafter, this wiring layer is also called a "third wiring layer") is formed from Al and/or Cu, or a layered film mainly composed of Al and/or Cu.

In the second insulating film 15B, a contact hole 17C (refer to FIG. 2) is formed at the position corresponding to the signal line 3 and the source electrode 9. In the second insulating film 15B, a contact hole 17B is formed at the position corresponding to the storage capacitor upper electrode 16 and the drain electrode 13. The signal line 3 and the source electrode 9 are electrically connected via the contact hole 17C. The storage capacitor upper electrode 16 and the drain electrode 13 are electrically connected via the contact hole 17B.

In the radiation detection element 10A according to the present exemplary embodiment, the TFT switch 4 is configured by the gate electrode 2, the first insulating film 15A, the source electrode 9, and the drain electrode 13. In the radiation detection element 10A according to the present exemplary embodiment, the charge storage capacitor 5 is configured by the storage capacitor lower electrode 14, the second insulating film 15B, and the storage capacitor upper electrode 16.

A coating type intermediate insulation film 12 is formed over the almost the entire surface of a region (almost the entire region) of the substrate 1, the region being provided with the pixels 7 to cover the third wiring layer. This intermediate insulation film 12 is formed from a photosensitive organic material of low permittivity (dielectric constant $\in_r$=2 to 4) (for example, a material such as a positive-working photosensitive acrylic resin: a base polymer of a copolymer of methacrylic acid and glycidyl methacrylate, into which a naphthoquinone-diazido positive-working photosensitive agent has been mixed). The film thickness of the intermediate insulation film 12 is 1 μm to 4 μm. In the radiation detection element 10A according to the present exemplary embodiment, capacitance between the metal layers disposed above and below the intermediate insulation film 12 can be suppressed to a low value by provision of the intermediate insulation film 12. Furthermore, generally such materials also have the functionality of a flattening layer, and exhibit the effect of flattening the steps in the layer below. In the intermediate insulation film 12, a contact hole 17A is formed at the position that faces the storage capacitor upper electrode 16.

On the intermediate insulation film 12, a lower electrode 18 is formed for each pixel 7 to cover the pixel region, and filling the contact hole 17A. The lower electrode 18 is formed of an amorphous transparent conductive oxide film (ITO) and is connected to the storage capacitor upper electrode 16 through the via hole 17A.

A semiconductor layer 20 made of amorphous selenium (a-Se) is uniformly formed on the lower electrode 18, over the almost entire surface of the detection region S of the substrate 1 where the pixels 7 are provided. The semiconductor layer 20 generates charges (electron-hole pairs) therein due to irradiation of radiation such as X-rays or the like.

On the semiconductor layer 20, an upper electrode 22 is formed. In the radiation detection element 10A according to the present exemplary embodiment, the sensor section 103 is configured by the upper electrode 22, the semiconductor layer 20, and the lower electrode 18.

The upper electrode 22 is connected to a bias power supply (not shown in the drawings). The upper electrode 22 is supplied with a bias voltage, from the bias power supply. According to the polarity of the charges, the charges that are generated in the semiconductor layer 20 migrates to the upper electrode 22 or the lower electrode 18, by the electric field caused by the bias voltage applied from the upper electrode 22.

Note that, in the radiation detection element 10A, a defect such as a leak or disconnection may occur in a manufacturing process, namely, when forming each layer on the substrate 1.

Figure 4:
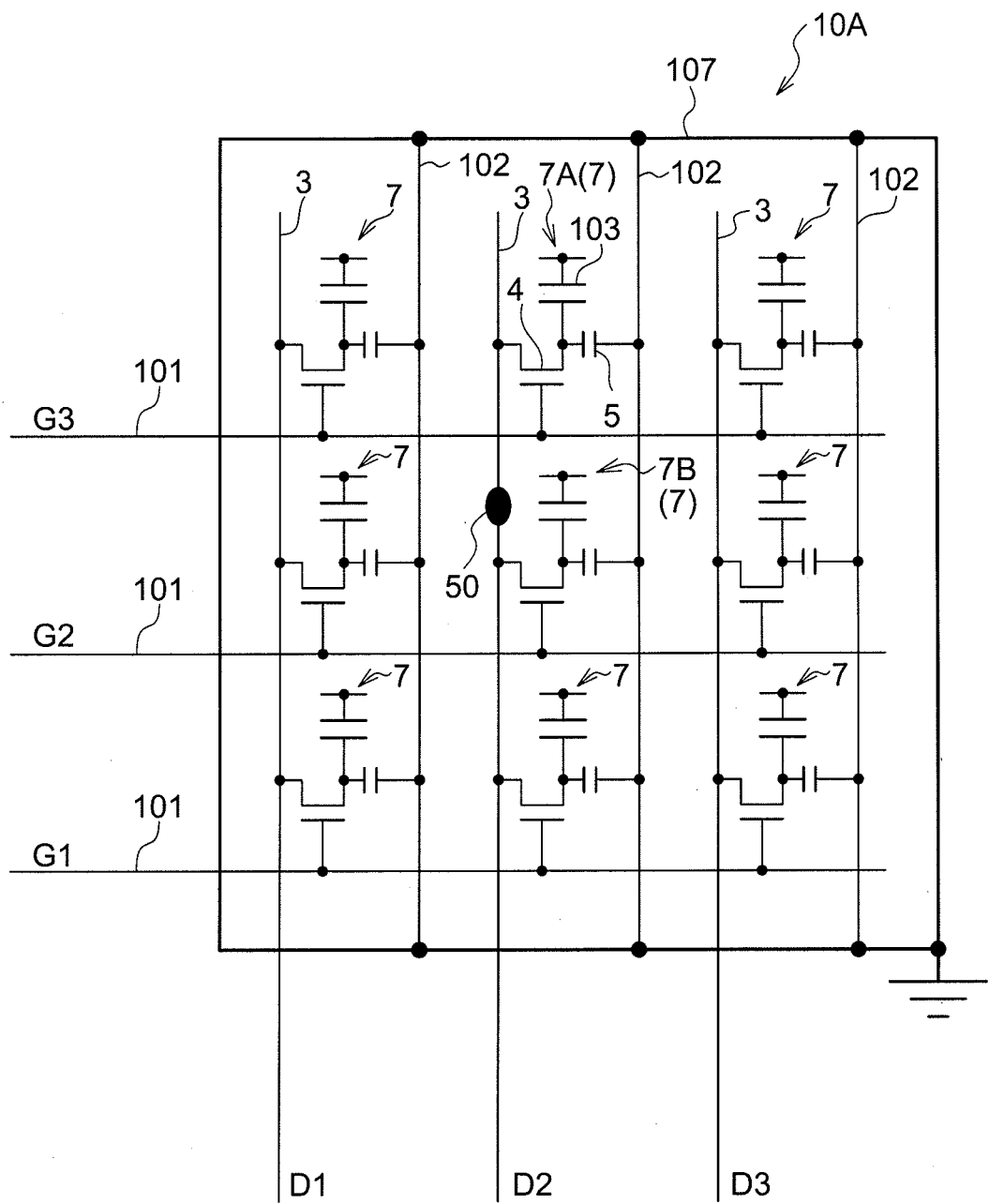
FIG. 4 is a diagram showing the configuration of a disconnected radiation detection element according to the first exemplary embodiment.

FIG. 4 shows the case where disconnection 50 has occurred in the signal line 3. As such, when the disconnection 50 has occurred, at the upstream side from a disconnection portion with respect to the signal detecting circuit 105, the charges of the pixels 7 that are connected to the signal line 3 where the disconnection 50 has occurred cannot be read out.

Figure 5:
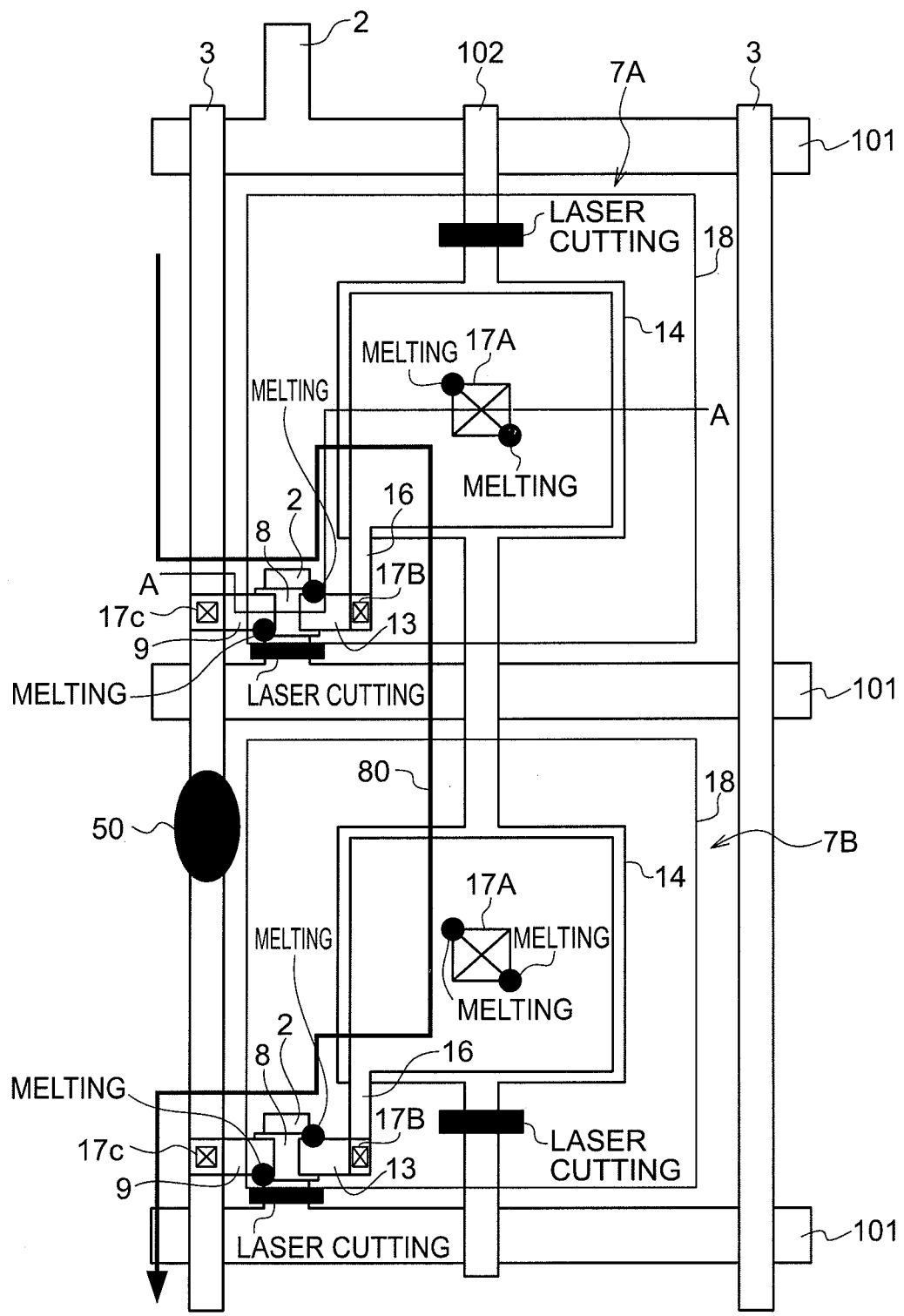
FIG. 5 is a plan view showing the configuration of each pixel of the radiation detection element where disconnection is repaired in the first exemplary embodiment.
Figure 6:
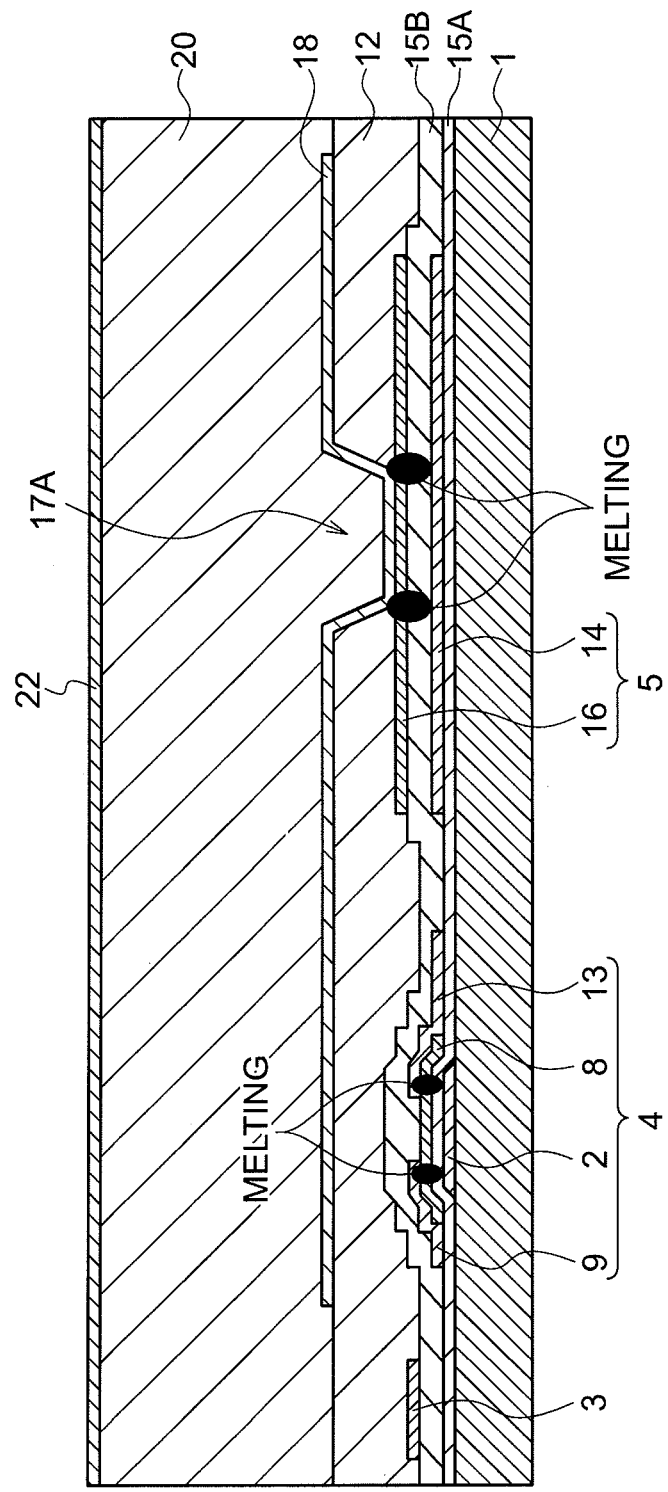
FIG. 6 is a cross-sectional view showing the sectional configuration of the line A-A of the radiation detection element of FIG. 5.
Figure 7:
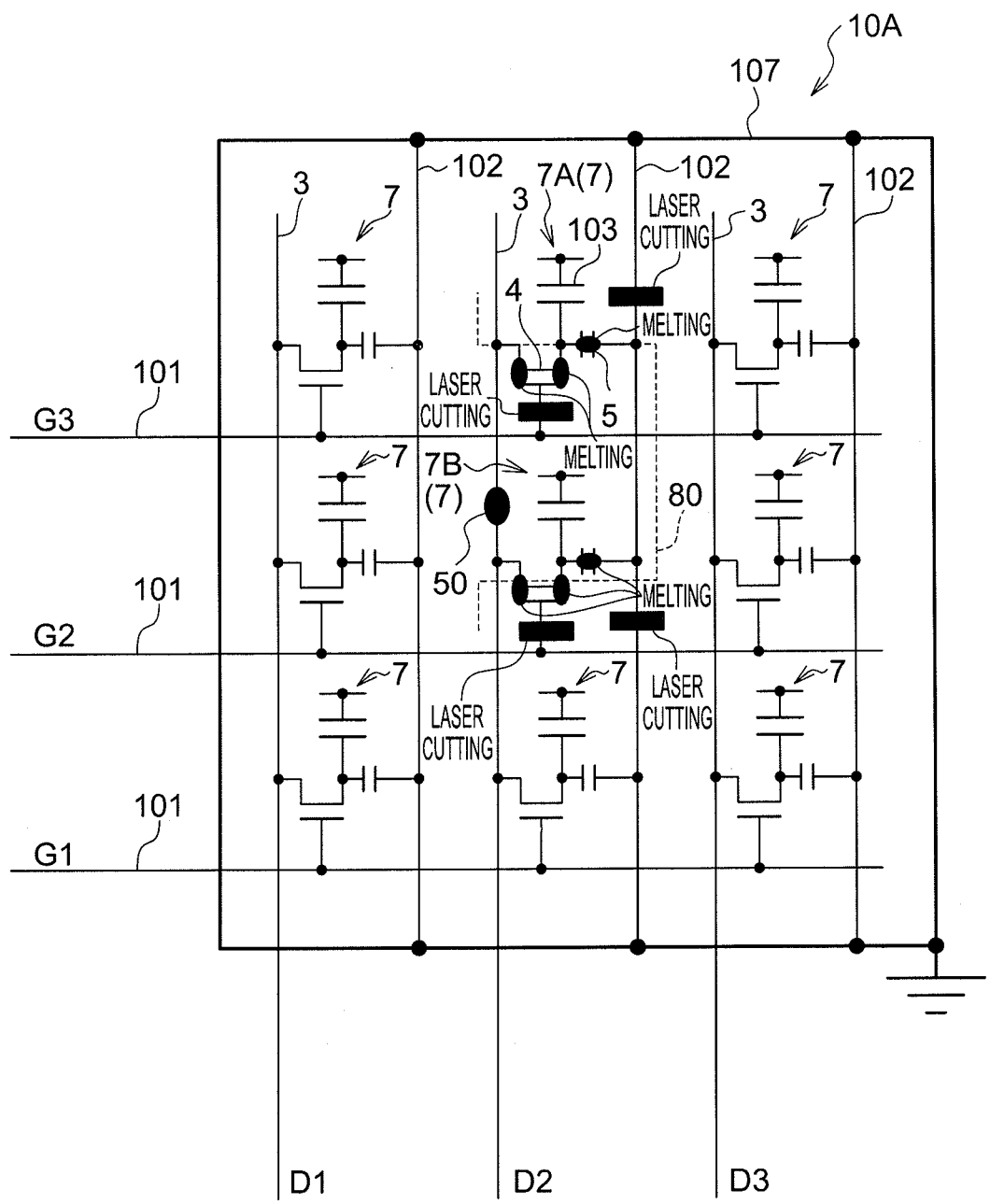
FIG. 7 is a diagram showing the configuration of the radiation detection element where disconnection is repaired in the first exemplary embodiment.

Therefore, in the present exemplary embodiment, in the two pixels 7A and 7B that are adjacent to each other, with the disconnection portion therebetween, and are connected to the signal line 3 where the disconnection 50 has occurred, a process shown in FIG. 5 to FIG. 7 is performed. Namely, in the present exemplary embodiment, laser light is irradiated to an overlapping portion of the gate electrode 2 and the source electrode 9 of the TFT switch 4, and an overlapping portion of the gate electrode 2 and the drain electrode 13, to cause each wiring layer and the insulating layer to melt. In the present exemplary embodiment, the laser light is irradiated to a portion of the contact hole 17A to cause each wiring layer and the insulating layer to melt. Accordingly, in the present exemplary embodiment, the source electrode 9, the gate electrode 2, and the drain electrode 13 of the TFT switch 4 are short-circuited to enable electric connection. Further, in the present exemplary embodiment, the storage capacitor lower electrode 18 and the storage capacitor upper electrode 16 of the charge storage capacitor 5 are short-circuited to enable electric connection. Accordingly, the signal line 3 and the storage capacitor line 102 are electrically connected via the TFT switches 4 and the charge storage capacitors 5 of the pixels 7A and 7B. Therefore, the parallel circuit 80 parallel to the disconnection portion is formed, and the disconnection 50 of the signal line 3 is bypassed by the parallel circuit 80.

Further, in the present exemplary embodiment, the laser light is irradiated onto the pixels 7A and 7B and a connection portion of the gate electrode 2 and the scan line 101 is cut. Together therewith, in the present exemplary embodiment, the storage capacitor line 102 is cut at both sides of the portion that functions as the parallel circuit 80 of the storage capacitor line 102. Accordingly, the parallel circuit 80 is electrically isolated from the storage capacitor line 102 and the scan line 101.

Therefore, by the present exemplary embodiment, reading out the charges from the pixels 7A and 7B becomes disabled. However, in the present exemplary embodiment, in the signal line 3 where the disconnection 50 has occurred, the charges of the pixel 7 that is connected at the upstream side from the disconnection portion with respect to the signal detecting circuit 105 can be read out.

Figure 8:
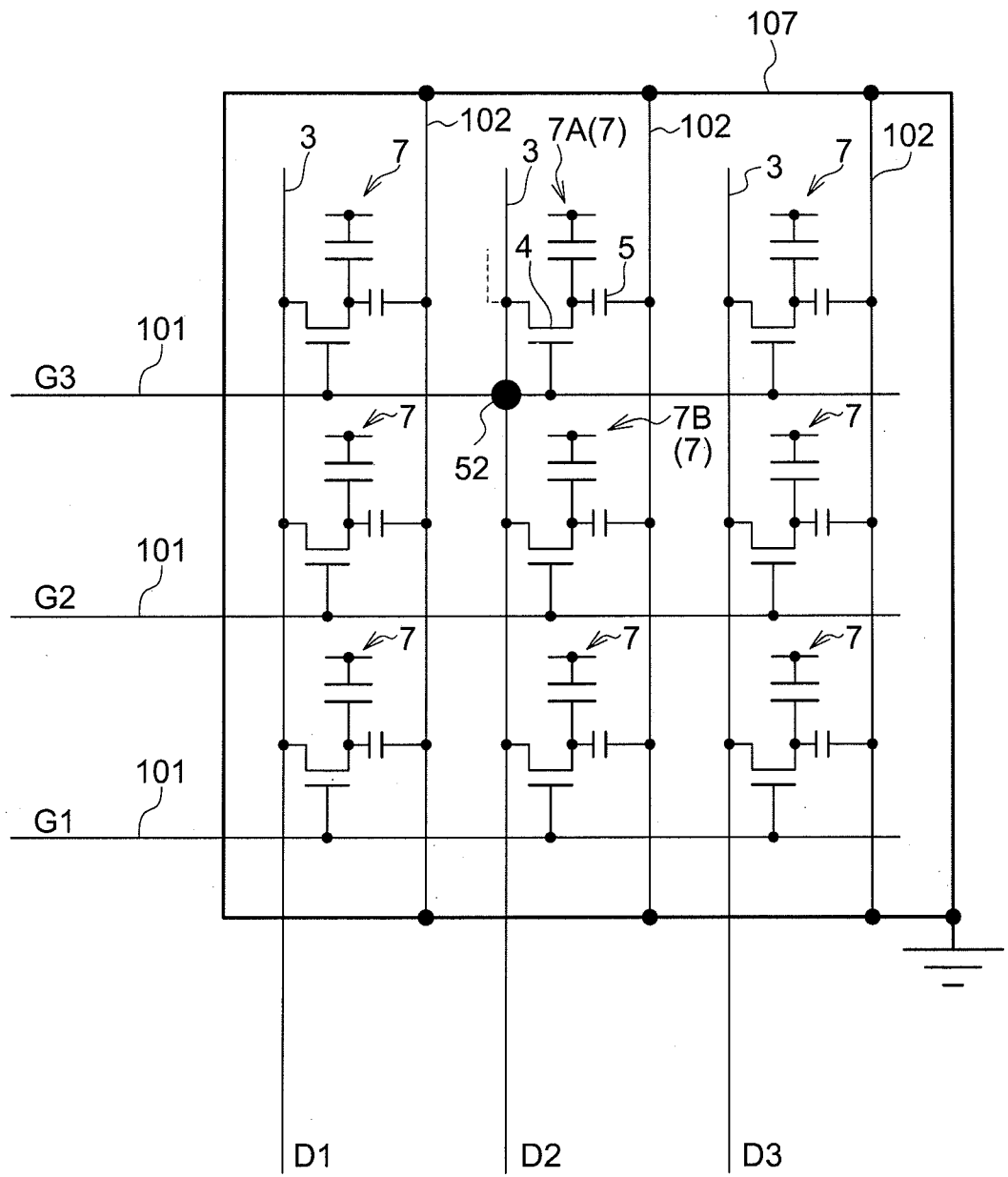
FIG. 8 is a diagram showing the configuration of the radiation detection element where a leak is occurred in the first exemplary embodiment.
Figure 9:
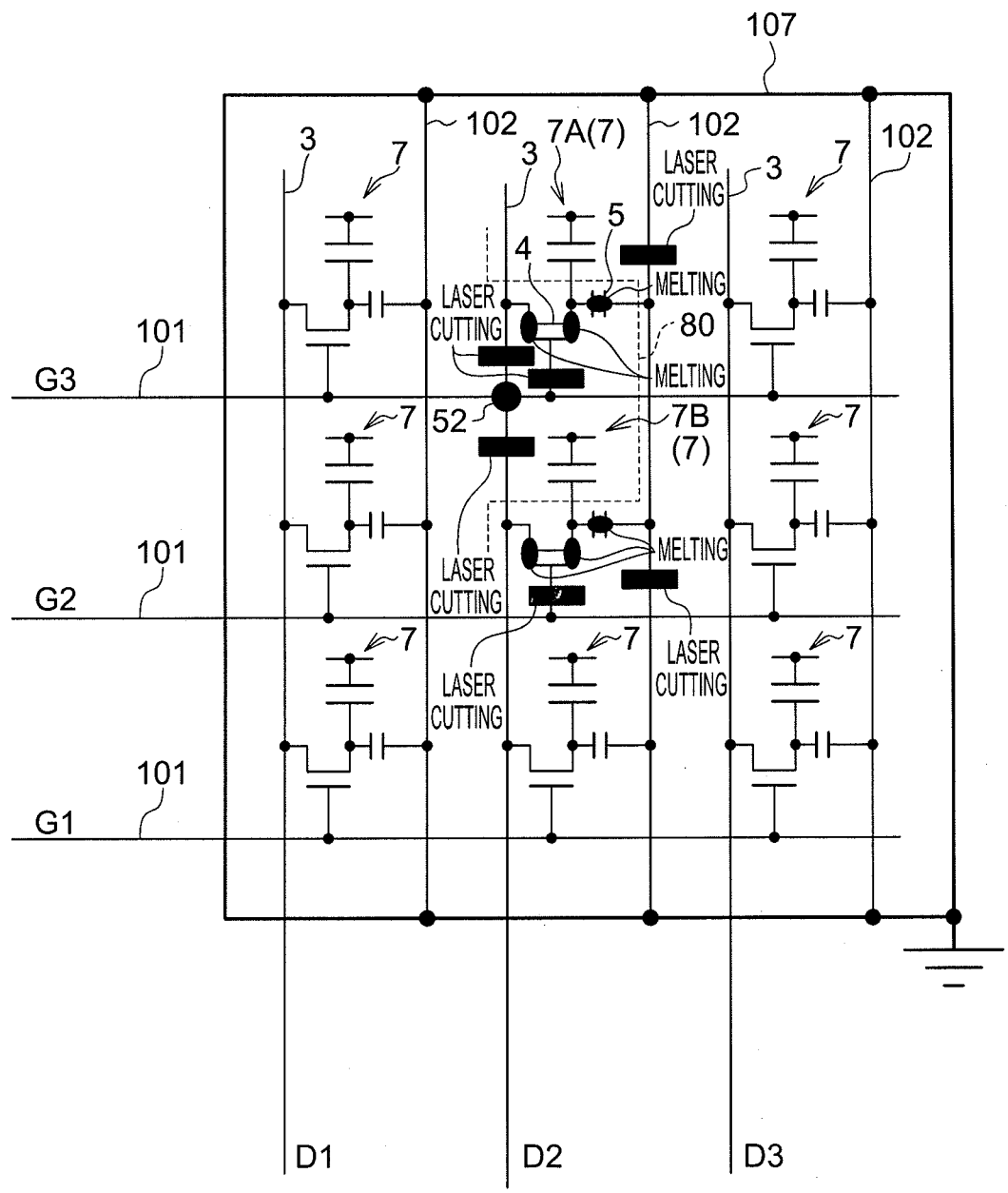
FIG. 9 is a plan view showing the configuration of the radiation detection element where the leak is repaired in the first exemplary embodiment.

Meanwhile, FIG. 8 shows a case where a leak 52 has occurred between the signal line 3 and the scan line 101, in the intersecting portion of the signal line 3 and the scan line 101. When the leak 52 is generated, a current from the scan line 101 flows through the signal line 3. As a result, the charges of the pixels 7 may not be correctly read.

Therefore, in the present exemplary embodiment, similar to the case of the disconnection, with respect to the two pixels 7A and 7B that are adjacent to each other, with the leak portion therebetween, and connected to the signal line 3 where the leak 52 is generated, the following process is executed. Namely, the laser light is irradiated to an overlapping portion of the gate electrode 2 and the source electrode 9 of the TFT switch 4 and to an overlapping portion of the gate electrode 2 and the drain electrode 13 to cause each wiring layer and the insulating layer to melt. Further, the laser light is irradiated to the portion of the contact hole 17A to cause each wiring layer and the insulating layer to melt. Accordingly, the source electrode 9, the gate electrode 2, and the drain electrode 13 of the TFT switch 4 are short-circuited to enable electric connection. Further, the storage capacitor lower electrode 18 and the storage capacitor upper electrode 16 of the charge storage capacitor 5 are short-circuited to enable electric connection.

Further, the laser light is irradiated to the pixels 7A and 7B, and the connection portion of the gate electrode 2 and the scan line 101 is cut. The storage capacitor line 102 is cut at both sides of the portion that functions as the parallel circuit 80 of the storage capacitor line 102. Furthermore, the laser light is irradiated to the portions between the leak of the signal line 3 where the leak 52 has occurred and the TFT switches 4 of the pixels 7A and 7B, and the signal line 3 and the scan line 101 where the leak has occurred are cut.

Accordingly, by the present exemplary embodiment, reading out the charges from the pixels 7A and 7B becomes disabled. However, in the present exemplary embodiment, the influence of the leak may be suppressed and the charges of the pixel 7 can be read out.

According to the present exemplary embodiment, the defect portion of the signal line 3 is bypassed by the parallel circuit 80 and connection is enabled. Therefore, in the present exemplary embodiment, the defect portion may be repaired, and the number of pixels from which charges cannot be read out when repaired may be minimized.

In the present exemplary embodiment, repairing is performed for the two pixels 7A and 7B that are adjacent to each other, with the defect portion therebetween. Thereby, in the present exemplary embodiment, the number of pixels from which reading the charges become disabled may be suppressed to the minimum.

According to the present exemplary embodiment, the storage capacitor line 102 is cut at both sides, and the portion thereof functions as the parallel circuit 80 parallel to the storage capacitor line 102. Therefore, in the present exemplary embodiment, the influence on the parallel circuit 80 from the storage capacitor line 102 may be suppressed.

According to the present exemplary embodiment, the connection portion of the gate electrode 2 and the scan line 101 is cut in the pixels 7A and 7B. Therefore, in the present exemplary embodiment, the influence on the parallel circuit 80 from the scan line 101 may be suppressed.

Further, according to the present exemplary embodiment, even in the case where the defect is a leak, the signal line 3 is cut between the leak portion of the signal line 3, where the leak has occurred, and the TFT switches 4 of the pixels 7A and 7B. Therefore, in the present exemplary embodiment, the charges of the pixel 7 may be read out without the influence from the leak.

In the radiation detection element 10A according to the first exemplary embodiment, the charges from the pixels 7A and 7B cannot be read out, and becomes a point defect. However, the position information that indicates the positions of the pixels 7A and 7B is stored in advance in the signal processing device 106, and the positions of the pixels 7A and 7B in the data are calculated based on the position information. Next, the data of the pixels 7A and 7B that has become the point defect is interpolated with data of the normal pixels 7 adjacent to the pixels 7A and 7B. Accordingly, the radiation detection element 10A according to the first exemplary embodiment may generate a data that is imaged by the pixels 7A and 7B.

Second Exemplary Embodiment

Next, as a second exemplary embodiment, a case where the present invention is applied to a radiation detection element 10B of an indirect-conversion-type that first converts radiation into light and then converts the converted light into charges, will be described.

Figure 10:
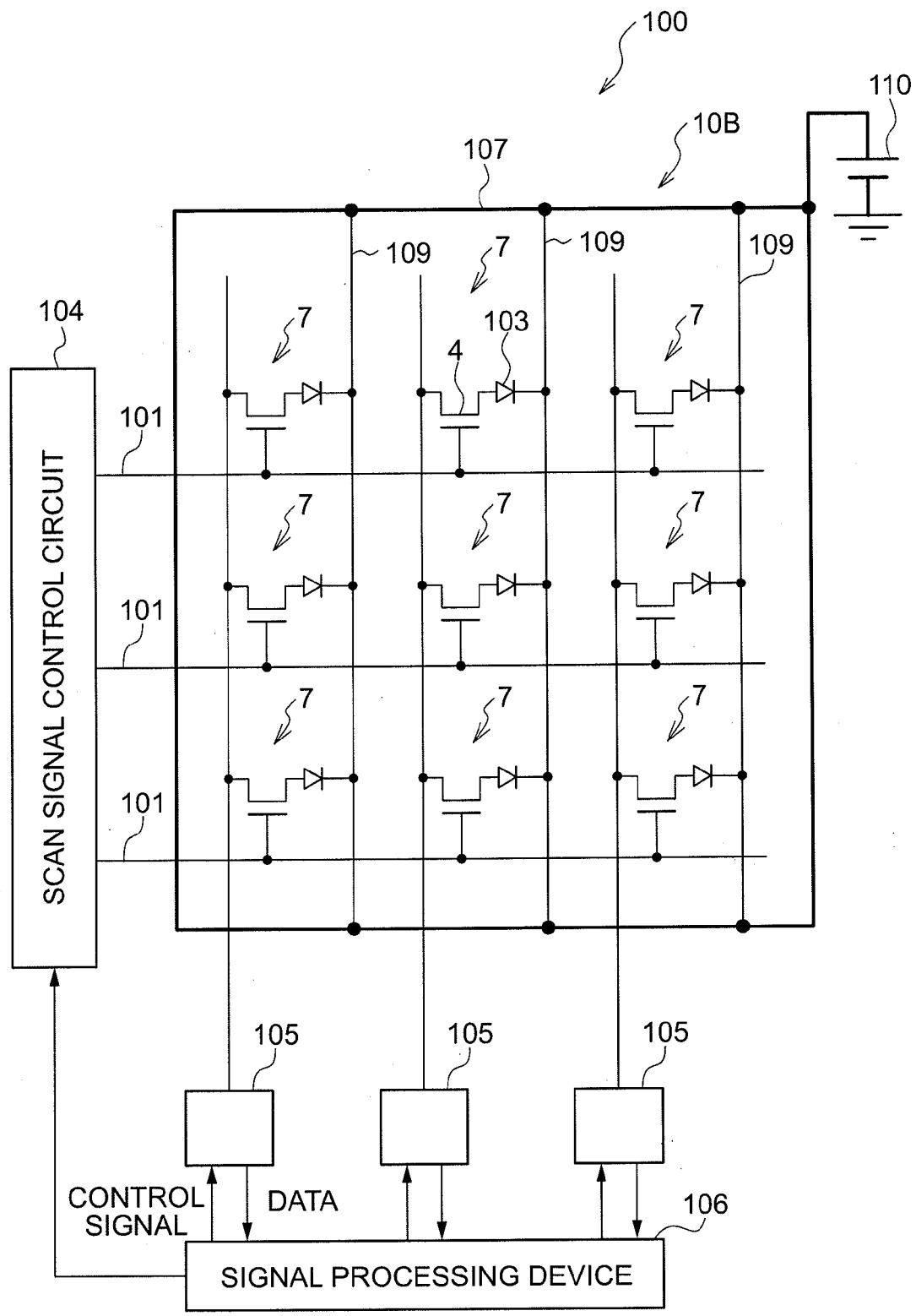
FIG. 10 is a diagram showing the entire configuration of a radiation imaging device according to a second exemplary embodiment of the present invention.

FIG. 10 shows the entire configuration of a radiation imaging device 100 using the radiation detection element 10B according to the second exemplary embodiment. In the second exemplary embodiment, portions that correspond to those of the first exemplary embodiment (refer to FIG. 1) are denoted by the same reference numerals as those of FIG. 1. Note that, a scintillator 29 that converts the radiation into the light is not shown in the drawings.

In the radiation detection element 10B, plural pixels 7 are provided in a matrix, along a first direction (horizontal direction of FIG. 10; hereinafter, also referred to as "row direction") and in a second direction (vertical direction of FIG. 10; hereinafter, also referred to "column direction") intersecting the first direction. Each of the pixels 7 is configured to include a sensor section 103 and a TFT switch 4. The sensor section 103 receives irradiated radiation and accumulates charges therein. The TFT switch 4 reads the charges that have been accumulated in the sensor section 103.

In the radiation detection element 10B, plural scan lines 101 for turning ON/OFF the TFT switch 4 are provided in the row direction. In the radiation detection element 10B, plural signal lines 3 for reading the charges that have been accumulated in the sensor section 103 are provided in the column direction. In the radiation detection element 10B, lines 107 that are connected to a power supply 110 to supply a predetermined bias voltage are provided to surround a detection region where the pixels 7 are provided in a matrix. Both ends of the common electrode line 109 are connected to the line 107. The sensor section 103 is connected to the common electrode line 109. The sensor section 103 is applied with a bias voltage via the common electrode line 109 and the line 107.

The signal detecting circuit 105 is connected to each signal line 3. The scan signal control device 104 is connected to each scan line 101. The signal processing device 106 is connected to the signal detecting circuit 105 and the scan signal control device 104.

Figure 11:
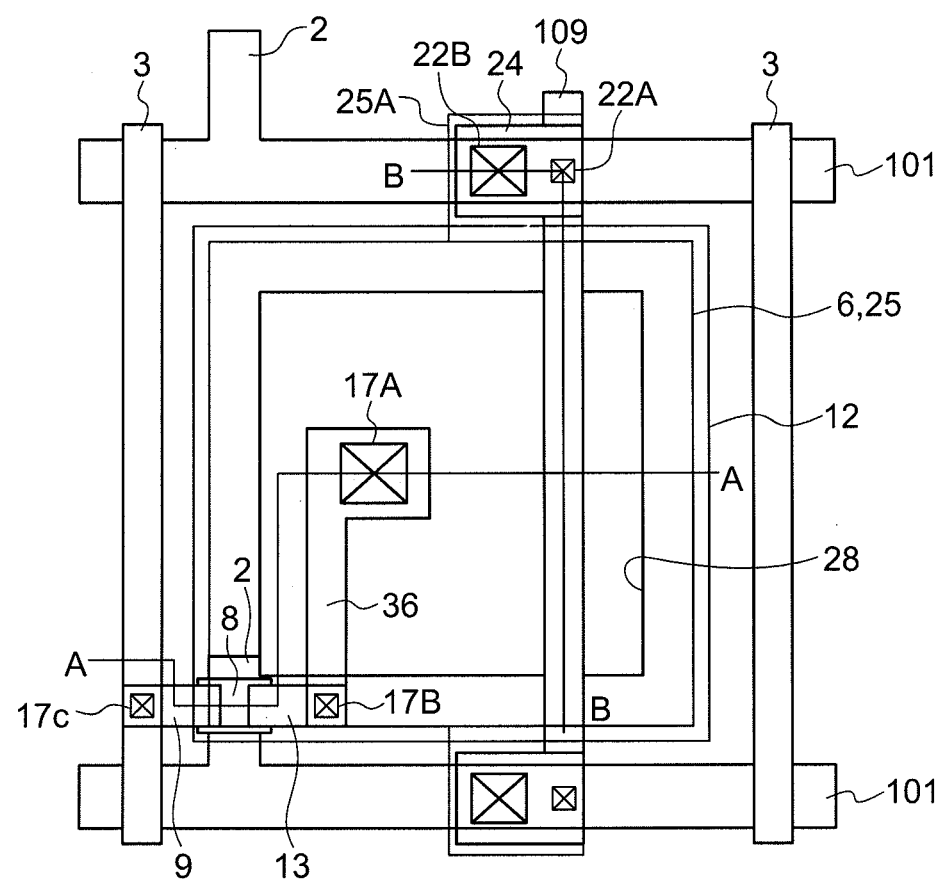
FIG. 11 is a plan view showing the configuration of each pixel of a radiation detection element according to the second exemplary embodiment.
Figure 12:
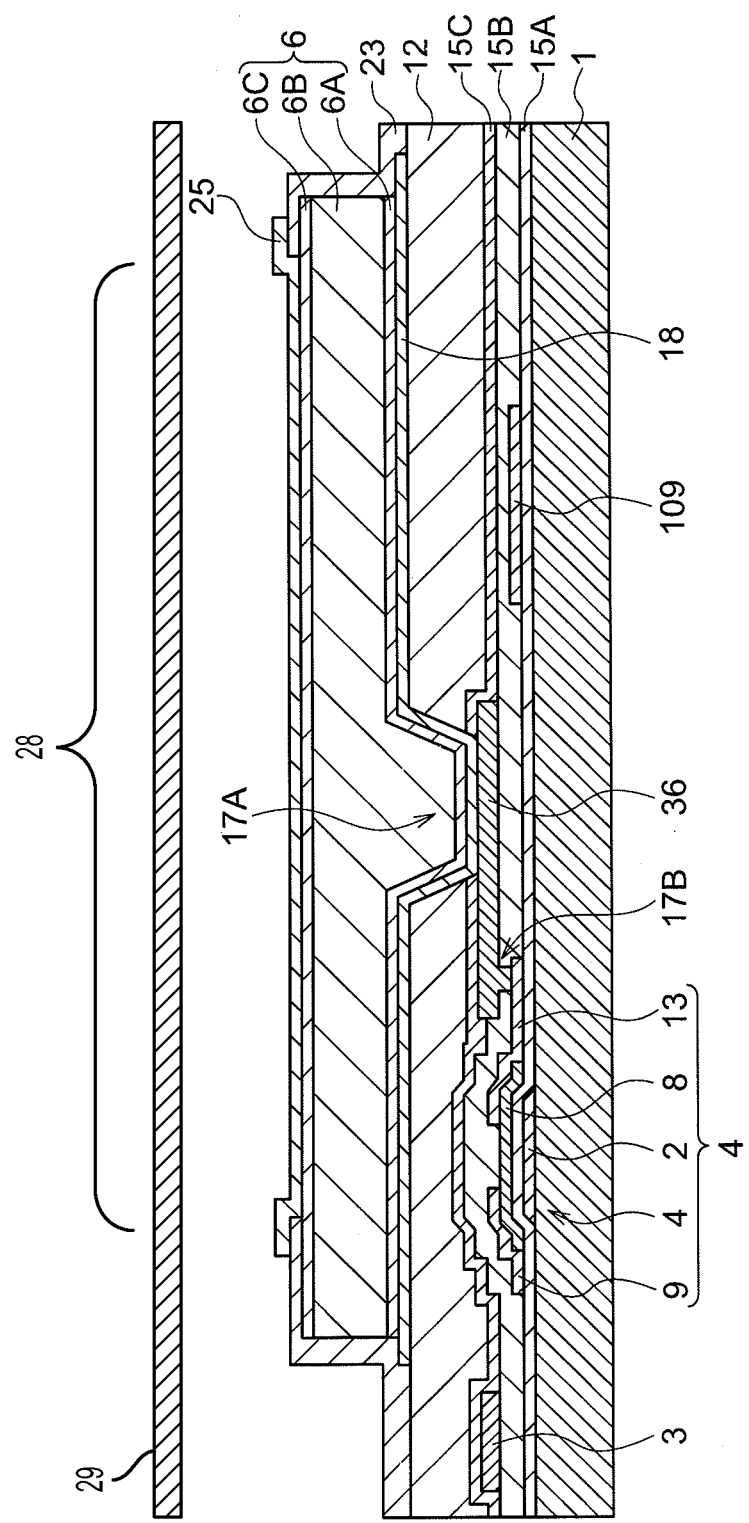
FIG. 12 is a cross-sectional view showing the sectional configuration of the line A-A of the radiation detection element of FIG. 11.
Figure 13:
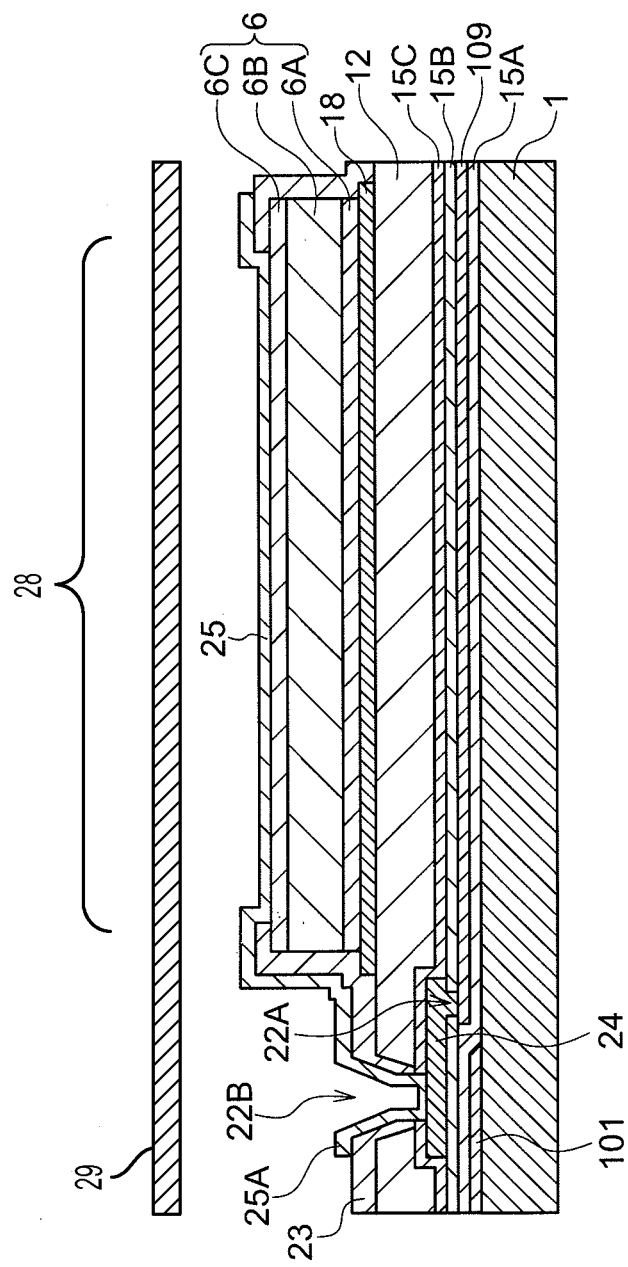
FIG. 13 is a cross-sectional view showing the sectional configuration of the line B-B of the radiation detection element of FIG. 11.

FIG. 11 is a plan view showing the structure of each pixel of the radiation detection element 10B of the indirect conversion type according to the present exemplary embodiment. FIG. 12 is a cross-sectional view taken along the line A-A of FIG. 11. FIG. 13 is a cross-sectional view taken along the line B-B of FIG. 11. Note that portions that correspond to the first exemplary embodiment (refer to FIG. 2 and FIG. 3) are denoted by the same reference numerals as those of the first exemplary embodiment.

As shown in FIG. 12 and FIG. 13, in the radiation detection element 10B, the scan lines 101 and the gate electrodes 2 are formed on an insulating substrate 1. The scan line 101 and the gate electrodes 2 are connected to each other (refer to FIG. 11).

On the scan lines 101 and the gate electrodes 2, a first insulating film 15A is formed on one surface to cover the scan lines 101 and the gate electrodes 2.

An island shape of a semiconductor active layer 8 is formed on each of the gate electrodes 2 above the insulation film 15.

On the above layers, a source electrode 9 and a drain electrode 13 are formed as the second wiring layer. In the second wiring layer in which the source electrode 9 and the drain electrode 13 are formed, common electrode lines 109 are also formed. Between the source electrode 9, the drain electrode 13, and the semiconductor active layer 8, an impurity doped semiconductor layer (not shown in the drawings) formed of impurity doped amorphous silicon is formed. Accordingly, the TFT switch 4 for switching is configured.

A second insulating film 15B is formed over substantially the whole surface (substantially the entire region) of regions provided with the pixels 7 above the substrate 1, so as to cover the semiconductor layer 8, the source electrode 9, the drain electrode 13, and the common electrode line 109.

On the second insulating film 15B, the signal line 3, a contact 24, and a contact 36 are formed as a third wiring layer.

In the second insulating film 15B, a contact hole 17C (refer to FIG. 11) is formed at a position corresponding to the signal line 3 and the source electrode 9. At the position of the second insulating film 15B that faces the contact 36 and the drain electrode 13, a contact hole 17B is formed. Further, at the position of the second insulating film 15B that faces the contact 24 and the common electrode line 109, a contact hole 22A is formed. The signal line 3 is connected to the source electrode 9 through the contact hole 17C (refer to FIG. 11). The contact 36 is connected to the drain electrode 13 through the contact hole 17B (refer to FIG. 12). The contact 24 is connected to the common electrode line 109 through the contact hole 22A (refer to FIG. 13).

A third insulating film 15C is formed on one surface of the third wiring layer. On the above layer, a coating type intermediate insulation film 12 is formed. The third insulating film 15C is formed, for example, from $SiN_x$ or the like, by, for example, CVD film forming. In the intermediate insulation film 12 and the third insulating film 15C, the contact hole 17A is formed at the position corresponding to the contact 36. Further, in the intermediate insulation film 12 and the third insulating film 15C, a contact hole 22B is formed at the position that corresponds to the contact 24.

On the intermediate insulation film 12, a lower electrode 18 of the sensor section 103 is formed to cover the pixel region, while filling each contact hole 17A. The lower electrode 18 is connected to the contact 36 via the contact hole 17A. The lower electrode 18 is connected to the drain electrode 13 of the TFT switch 4 via the contact 36. As long as the lower electrode 18 is electrically conductive, there are no particular limitations to the material of the lower electrode 18 for cases in which the thickness of a semiconductor layer 6, described below, is about 1 μm. Hence the lower electrode 18 may be formed with an electrically conductive metal such as, for example, an Al based material, ITO or the like.

However, in cases in which the film thickness of the semiconductor layer 6 is thin (about 0.2 μm to 0.5 μm), light is not sufficiently absorbed by the semiconductor layer 6, and measures need to be taken to prevent an increase in leak current flow due to light illumination onto the TFT switch 4. Consequently, in such cases the lower electrode 18 is preferably an alloy or layered film with a metal having light-blocking ability as a main component.

The semiconductor layer 6 is formed on the lower electrode 18 and functions as a photodiode. In the present exemplary embodiment, a photodiode of PIN structure is employed, in which an $n^+$ layer, an i layer and a $p^+$ layer ($n^+$ amorphous silicon, amorphous silicon, $p^+$ amorphous silicon) are layered on each other as the semiconductor layer 6. Consequently, in the semiconductor layer 6 of the present exemplary embodiment, an $n^+$ layer 6A, an i layer 6B and a $p^+$ layer 6C are formed, layered in this sequence from the bottom layer. The i layer 6B generates charge (pairs of free electrons and free holes) due to illumination with light. The $n^+$ layer 6A and the $p^+$ layer 6C function as contact layers, and respectively electrically connect the lower electrode 18 and an upper electrode 25 with the i layer 6B.

In the present exemplary embodiment, the lower electrode 18 is formed with larger surface area than the semiconductor layer 6. Further, the light illumination side of the TFT switch 4 is covered by the semiconductor layer 6. Accordingly, in the present exemplary embodiment, the proportion of surface area within the pixel regions that can receive light (called the fill factor) is made larger, and light can be suppressed from being incident on the TFT switches 4.

On the intermediate insulation film 12 and the semiconductor layer 6, a protective insulating film 23 is formed to have an opening 28 in a portion for each semiconductor layer 6. In the protective insulating film 23, the contact hole 22B is formed at the position that faces the contact 24. Similar to the insulating films 15A to 15C, the protective insulating film 23 is formed, for example, from $SiN_x$ or the like by, for example, Chemical Vapor Deposition (CVD) film forming. On the semiconductor layer 6 and the protective insulating film 23, an upper electrode 25 is formed to cover the opening 28 of the protective insulating film 23. The upper electrode 25 is, for example, formed using a material having high transmissivity to light, such as ITO, Indium Zinc Oxide (IZO) or the like. In the radiation detection element 10B according to the present exemplary embodiment, the sensor section 103 is configured by the upper electrode 25, the semiconductor layer 6, and the lower electrode 18.

The upper electrode 25 has a connecting portion 25A that is connected to the common electrode line 109 to supply a bias voltage to the upper electrode 25. The connecting portion 25A is connected to the contact 24 via the contact hole 22B. Accordingly, the upper electrode 25 is electrically connected to the common electrode line 109 via the contact 24.

In the radiation detection element 10B configured as described above, as required, a protection layer may be formed from an insulating material with low light absorption characteristics, and a scintillator 29, configured, for example, from GOS or the like, is attached using an adhesive resin with low light absorption characteristics formed on the surface of the protection layer.

Note that, similar to the radiation detection element 10A, the defect such as a leak or disconnection may occur even in the radiation detection element 10B, in a manufacturing process, namely, when forming each layer on the substrate 1.

Figure 14:
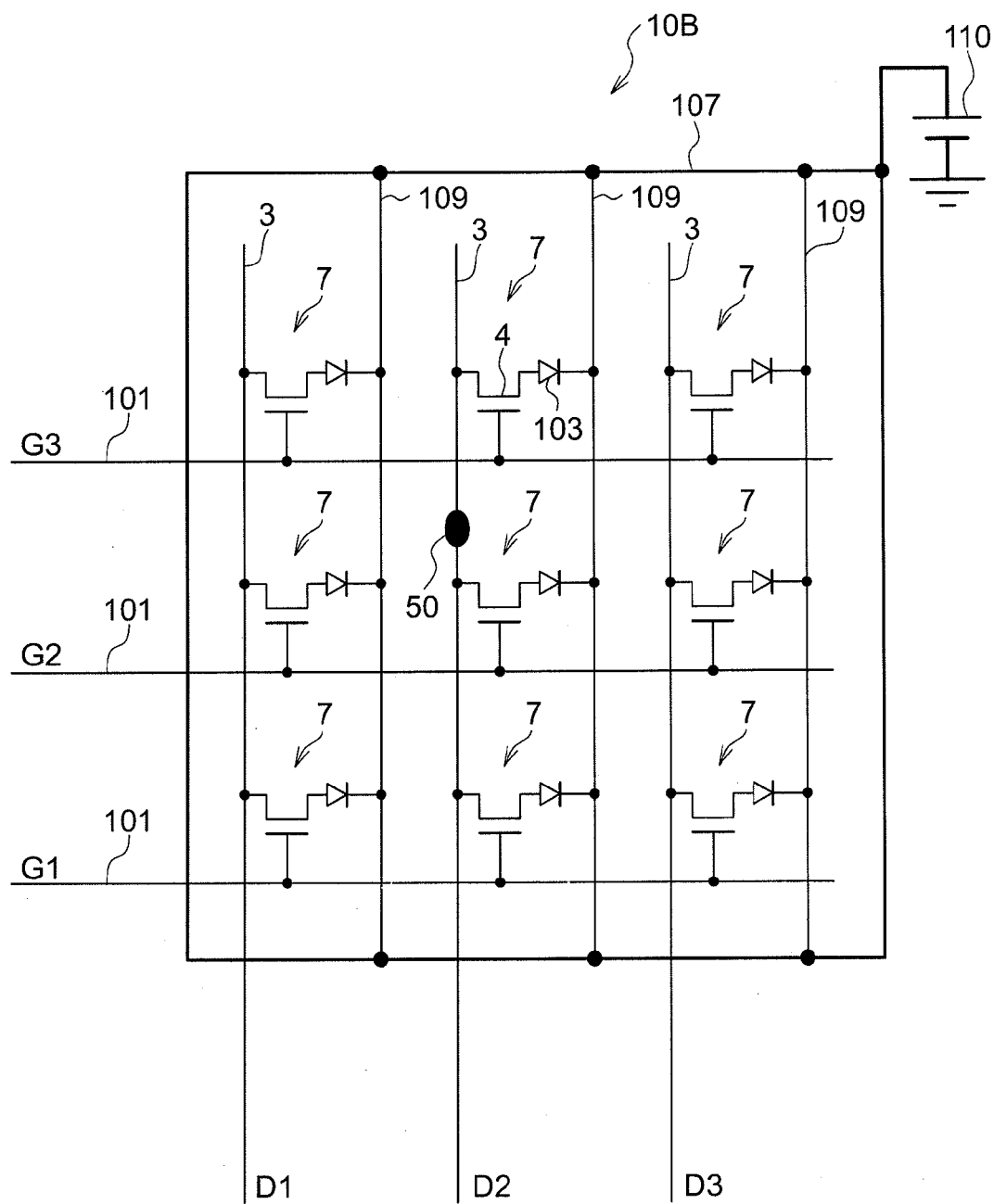
FIG. 14 is a diagram showing the configuration of a disconnected radiation detection element according to the second exemplary embodiment.

FIG. 14 shows a case where the disconnection 50 has occurred in the signal line 3. When the disconnection 50 has occurred, at the upstream side from the disconnection portion with respect to the signal detecting circuit 105, the charges of the pixels 7 that are connected to the signal line 3 where the disconnection 50 has occurred may not be read out.

Figure 15:
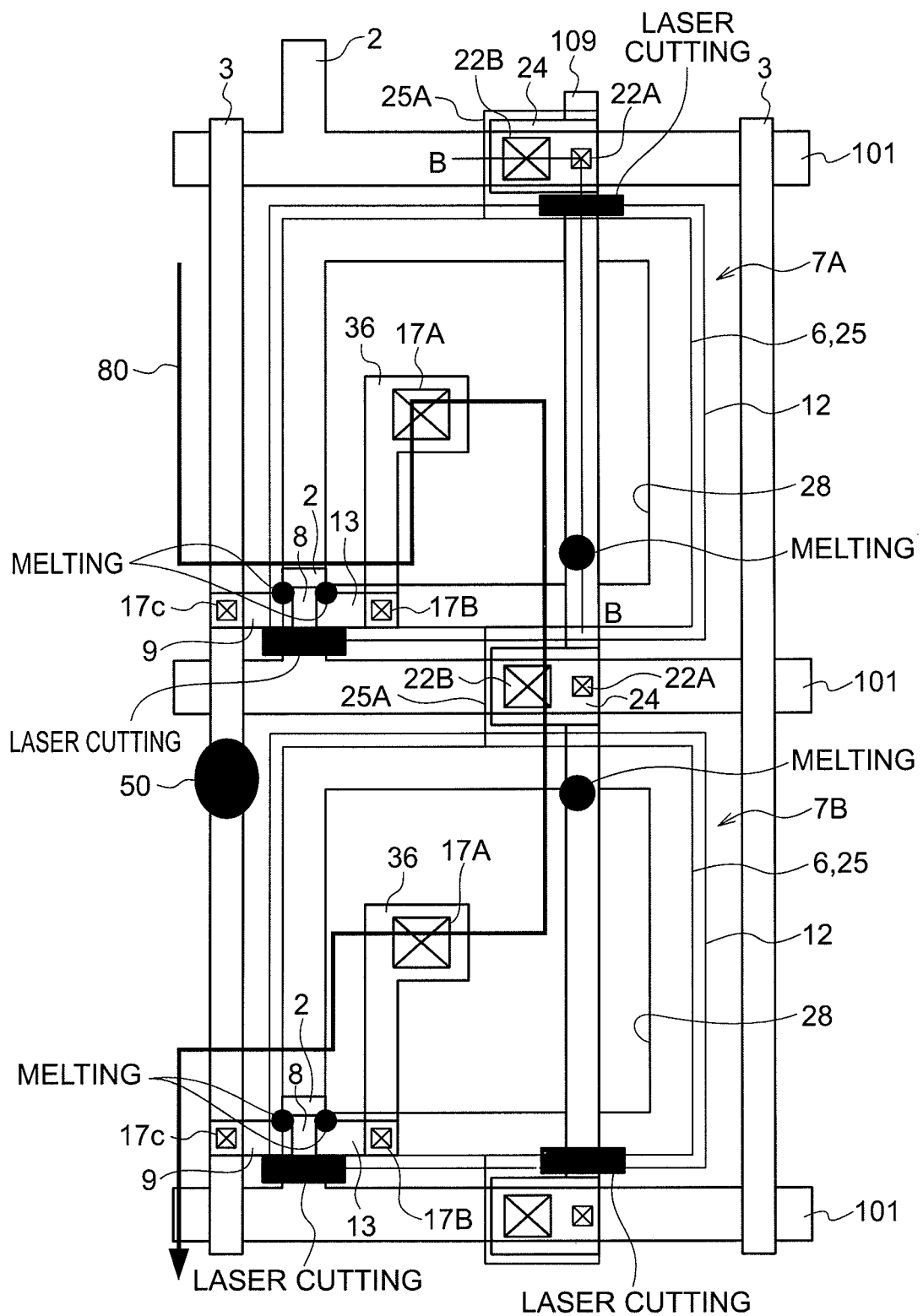
FIG. 15 is a plan view showing the configuration of each pixel of the radiation detection element where disconnection is repaired in the second exemplary embodiment.
Figure 16:
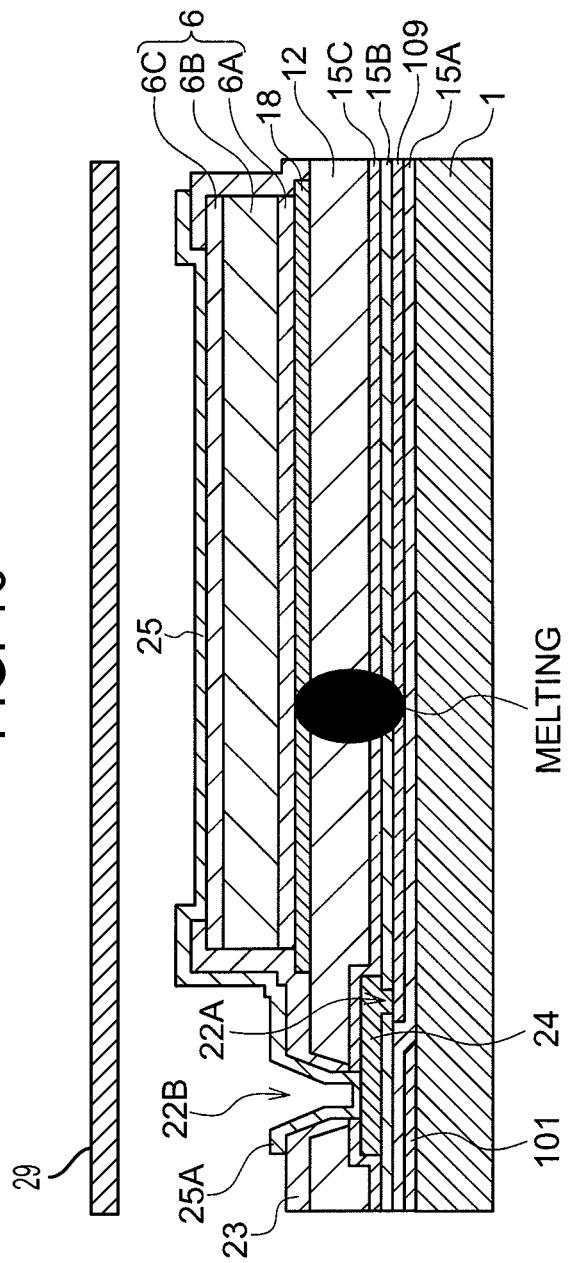
FIG. 16 is a cross-sectional view showing the sectional configuration of the line B-B of the radiation detection element of FIG. 15.
Figure 17:
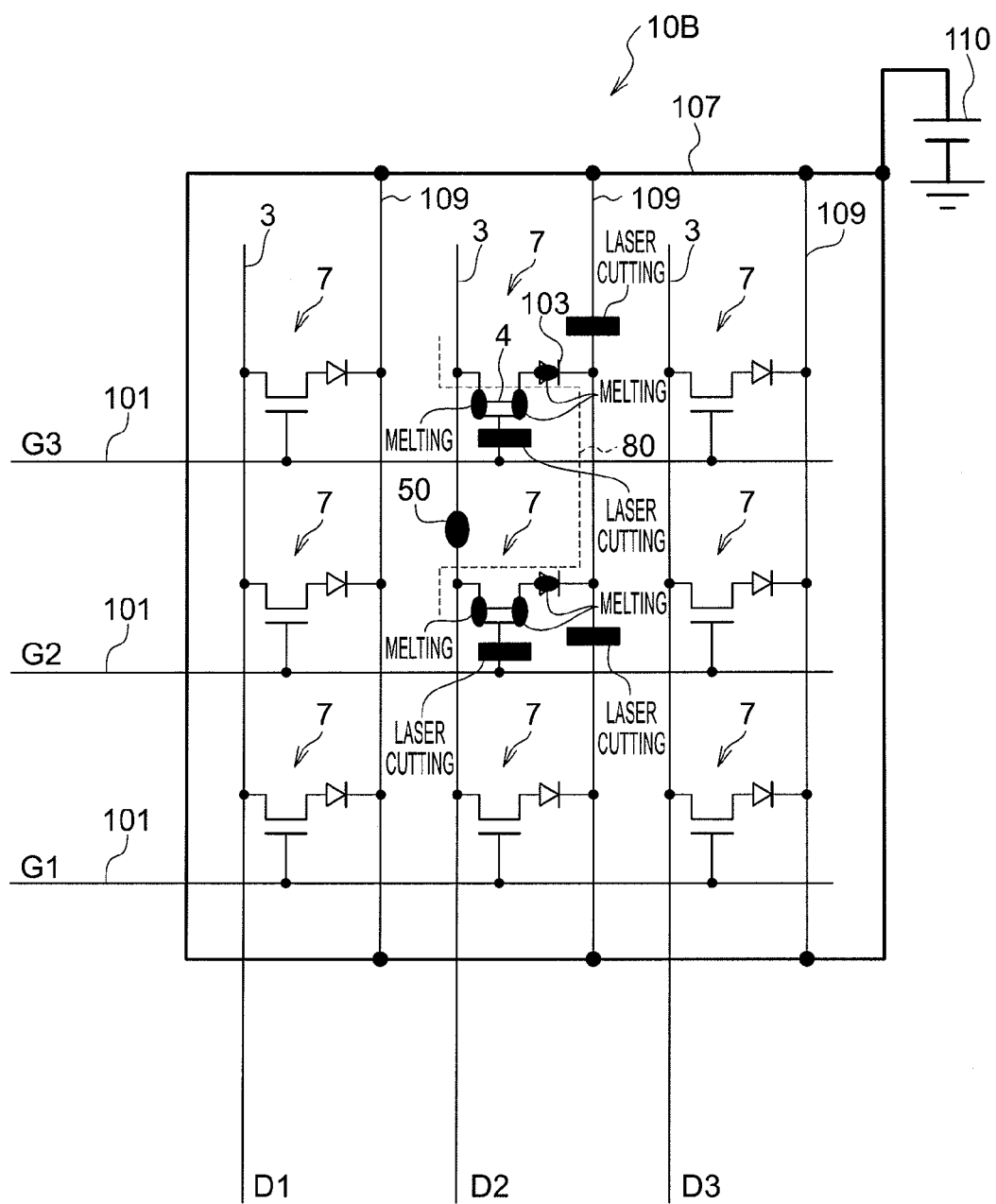
FIG. 17 is a plan view showing the configuration of the radiation detection element where disconnection is repaired in the second exemplary embodiment.

Therefore, in the present exemplary embodiment, in the two pixels 7A and 7B that are adjacent to each other, with the disconnection portion therebetween, and are connected to the signal line 3 where the disconnection 50 has occurred, a process shown in FIGS. 15 to 17 is executed. Specifically, laser light is irradiated onto an overlapping portion of the gate electrode 2 and the source electrode 9 of the TFT switch 4, and onto an overlapping portion of the gate electrode 2 and the drain electrode 13, to cause each wiring layer and the insulating layer to melt. Further, the laser light is irradiated onto an overlapping portion of the semiconductor layer 6 and the common electrode line 109, to cause each wiring layer and the insulating layer to melt. As a result, in the present exemplary embodiment, the source electrode 9, the gate electrode 2, and the drain electrode 13 of the TFT switch 4 are short-circuited to enable electric connection. In the present exemplary embodiment, the storage capacitor lower electrode 18 and the common electrode line 109 are short-circuited to enable electric connection. Accordingly, the signal line 3 and the common electrode line 109 are electrically connected via the TFT switches 4, the contacts 36, and the lower electrodes 18 of the pixels 7A and 7B. Therefore, according to the present exemplary embodiment, the parallel circuit 80 parallel to the disconnection 50 is configured, and the disconnection 50 of the signal line 3 is bypassed by the parallel circuit 80.

Further, in the present exemplary embodiment, the laser light is irradiated onto the pixels 7A and 7B and a connection portion of the gate electrode 2 and thus the scan line 101 is cut. Furthermore, in the present exemplary embodiment, the common electrode line 109 is cut at both sides of the portion that functions as the parallel circuit 80 of the common electrode line 109. Accordingly, the parallel circuit 80 is electrically isolated from the common electrode line 109 and the scan line 101.

Accordingly, by the present exemplary embodiment, reading out the charges from the pixels 7A and 7B becomes disabled. However, in the present exemplary embodiment, the charges of the pixel 7 that is connected at the upstream side from the disconnection portion, with respect to the signal detecting circuit 105 in the signal line 3 where the disconnection 50 has occurred, may be read out.

In the present exemplary embodiment, when the leak is generated between the signal line 3 and the scan line 101, similar to the first exemplary embodiment, a next process is executed. Specifically, laser light is irradiated onto the portions between the leak portion of the signal line 3 where the leak has occurred and the TFT switches 4 of the pixels 7A and 7B. Thus the storage capacitor line 102 and the scan line 101 where the leak has occurred are electrically isolated. Accordingly, reading out the electrical charges from the pixels 7A and 7B cannot be preformed. However, in the present exemplary embodiment, the influence from the leak may be suppressed and the charges of the pixel 7 may be read out.

According to the present exemplary embodiment, the defect portion of the signal line 3 is bypassed by the parallel circuit 80. Therefore, in the present exemplary embodiment, and the number of pixels from which charges cannot be read out when repaired may be minimized.

According to the present exemplary embodiment, repairing is performed in the two pixels 7A and 7B that are adjacent to each other, with the defect portion therebetween. Accordingly, in the present exemplary embodiment, a defect portion may be repaired, and the number of pixels from which charges cannot be read out when repaired may be minimized.

According to the present exemplary embodiment, the common electrode line 109 is cut at both sides of the portion that functions as the parallel circuit 80 of the common electrode line 109. Therefore, in the present exemplary embodiment, the influence on the parallel circuit 80 from the common electrode line 109 may be suppressed.

According to the present exemplary embodiment, the connection portion of the gate electrode 2 and the scan line 101 is cut in the pixels 7A and 7B. Therefore, in the present exemplary embodiment, the influence on the parallel circuit 80 from the scan line 101 may be suppressed.

Even in the radiation detection element 10B according to the second exemplary embodiment, reading out the charges of the pixels 7A and 7B cannot be read out, and becomes a point defect. However, the position information that indicates the positions of the pixels 7A and 7B is stored in advance in the signal processing device 106, and the positions of the pixels 7A and 7B in the data are calculated based on the position information. Next, the data of the pixels 7A and 7B that has become the point defect is interpolated with the data of the normal pixel 7 adjacent to the pixels 7A and 7B. Accordingly, the radiation detection element 10B according to the second exemplary embodiment may generate data that is imaged by the pixels 7A and 7B.

In the exemplary embodiments described above, a case where repairing to short-circuit the signal line 3 and the storage capacitor line 102 or the common electrode line 109 is performed in the two pixels 7A and 7B adjacent to each other, with the defect portion therebetween, has been described. However, the present invention is not limited thereto. For example, repairing may be performed in three or more pixels 7 with the defect portions therebetween, and the parallel circuit parallel to the defect portions may be configured. The pixels 7 where the repairing is performed may not be adjacent to each other, with the defect portions therebetween. When the pixels 7 where the repairing is performed are disposed with the defect portions therebetween, the pixels may be apart a distance as much as several pixels. Since the pixels 7 where the repairing is performed become the point defects, the pixels are apart a distance as much as several pixels. Accordingly, deterioration of the image quality may be suppressed due to the interpolation processing.

Figure 18:
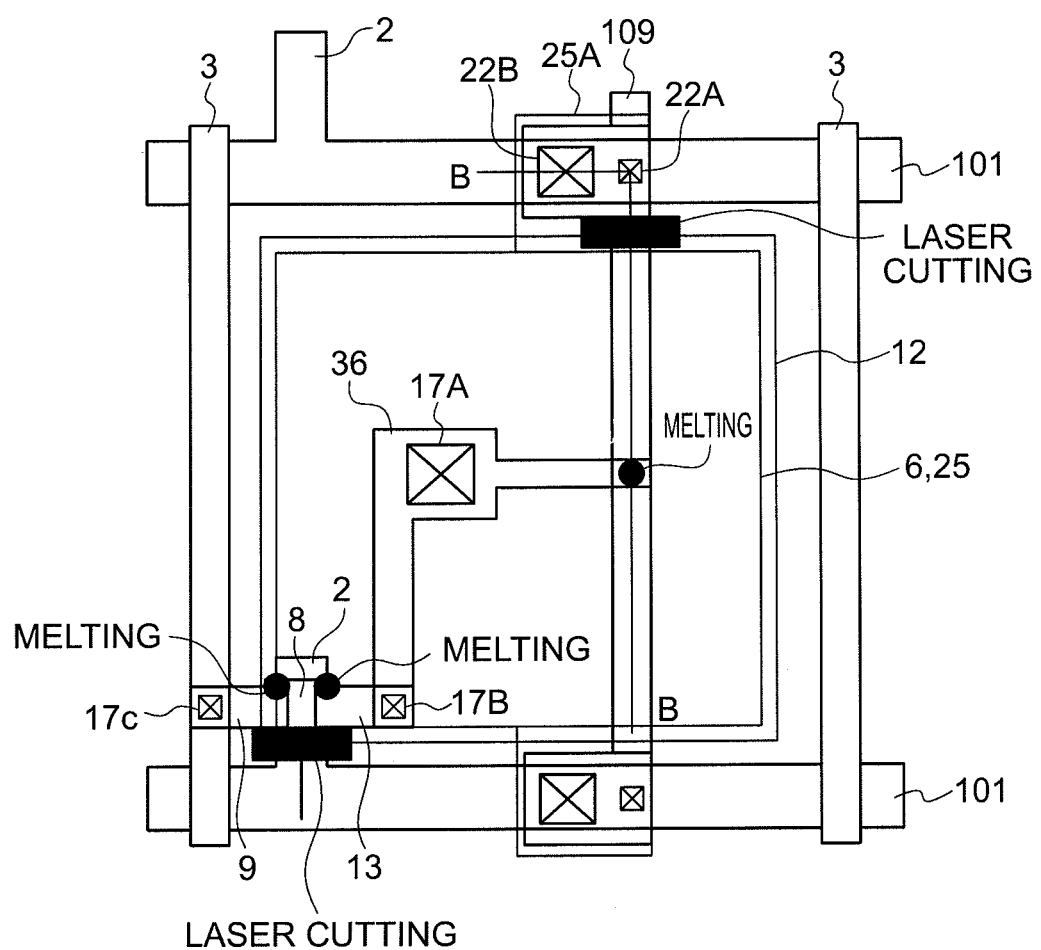
FIG. 18 is a plan view showing the configuration of each pixel of a radiation detection element according to an alternative exemplary embodiment of the present invention.
Figure 19:
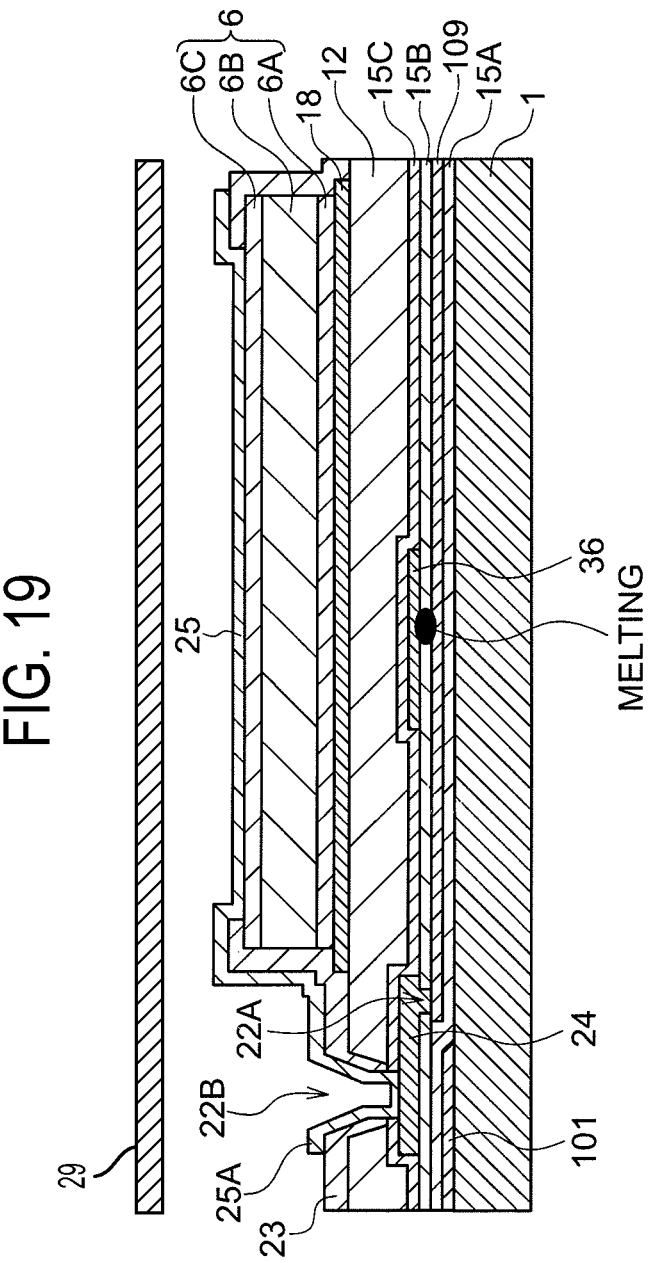
FIG. 19 is a cross-sectional view showing the sectional configuration of the line B-B of the radiation detection element of FIG. 18.

In the second exemplary embodiment, a case where the overlapping portion of the semiconductor layer 6 and the common electrode portion 109 is irradiated with laser light and melted, and the lower electrode 18 and the common electrode line 109 are short-circuited to enable electric connection has been described. However, the present invention is not limited thereto. For example, in an alternative exemplary embodiment, as shown in FIG. 18 and FIG. 19, the contact 36 is extended to overlap the common electrode line 109, and the overlapping portion of the contact 36 and the common electrode portion 109 is irradiated with laser light and therefore, melts. In the alternative exemplary embodiment, the contact 36 and the common electrode line 109 are short-circuited to enable electric connection. In the second exemplary embodiment, a case where the contact 36 is provided has been described. However, the contact 36 may be applied to the first exemplary embodiment. When the common electrode lines 109 and the contacts 36 are provided to partially overlap each other through only the second insulating film 15B, the contact 36 and the common electrode line 109 may be easily melted when the overlapping portion is irradiated with laser light. In the exemplary embodiment, the portion between the common electrode line 109 and the contact 36 is configured as only the second insulating film 15B of one layer. However, the present invention is not limited thereto. The insulating film may be composed of plural layers.

In the exemplary embodiments, a case where the alkali-free glass is used as the material of the substrate 1, has been described. However, the present invention is not limited thereto. For example, the insulating substrate 1 may be formed using an insulator such as polyimide. The material of the substrate in this invention is not limited thereto.

In the first exemplary embodiment, a case where the semiconductor layer 20 is continuous in each pixel 7 in the radiation detection element 10A of the direct-conversion-type has been described. However, the present invention is not limited thereto. For example, in the alternative exemplary embodiment, the present invention may be applied to the case where a photodiode layer is continuous in each pixel. FIG. 5 and FIG. 6 of JP-A No. 2008-505496 show an example of the case where a photodiode layer is continuous in each pixel.

In the radiation detection elements 10A and 10B, the radiation may be irradiated from the side of the surface on which the sensor section 103 is provided, or the radiation may be irradiated from the side of the substrate 1 (back side). In this case, in the radiation detection element 10B of the indirect-conversion-type, in a case where the radiation is irradiated from the surface side, light is emitted stronger at the side of the top surface of the scintillator 29 (opposite side of the substrate 1). On the other hand, in the radiation detection element 10B of the indirect-conversion-type, when the radiation is irradiated from the back side, the radiation that is transmitted through the substrate 1 is incident on the scintillator 29 and the light is emitted stronger at the substrate 1 side of the scintillator 29. In the semiconductor layer 6, the charges are generated due to light generated at the scintillator 29. For this reason, in the radiation detection element 10B of the indirect conversion type, in the case where the radiation is irradiated from the surface side, the radiation rarely transmit the substrate 1, as compared with the case where the radiation is irradiated from the back side. Therefore, in the case where the radiation is irradiated from the surface side, sensitivity to the radiation may be designed to be high. In the case where the radiation is irradiated from the back side, the light emission position of the scintillator 29 with respect to each semiconductor layer 6 is closer, as compared with the case where the radiation is irradiated from the surface side. For this reason, in the case where the radiation is irradiated from the back side, resolution of a radiation image that is obtained by imaging is high.

In the above exemplary embodiments, a case where the present invention is applied to the radiation imaging device 100 that detects the image by detecting the X-rays, has been described. However, the present invention is not limited thereto. For example, the electromagnetic wave that becomes the detection object may be, visible light, ultraviolet rays, infrared rays or gamma rays.

The configuration (refer to FIGS. 1 and 10) of the radiation imaging device 100 and the configurations (refer to FIGS. 2 to 9 and FIGS. 1 to 19) of the radiation detection elements 10A and 10B that are described in the above exemplary embodiments are only example. Therefore, various changes may be made in a range within the spirit and scope of the present invention.

What is claimed is:

1. A radiation detection element comprising:
    a plurality of pixels, disposed in a matrix along a first direction and a second direction intersecting the first direction, that accumulate charges generated due to irradiation of radiation, and that include switching elements for reading out the accumulated charges;
    a plurality of signal lines, connected to the switching elements, and through which the charges that have been accumulated in the pixels flow according to switching states of the switching elements;
    a plurality of parallel lines, provided parallel to the plurality of signal lines; and
    a plurality of scan lines, connected to the switching elements, and through which control signals for switching the switching elements flow,
    wherein, in a plurality of adjacent pixels that are connected to a signal line having a defect portion where a defect has occurred and that are adjacent to the defect portion, the signal lines and the parallel lines are short-circuited to configure a parallel circuit parallel to the defect portion, by cutting connection points of the switching elements and the scan lines, and short-circuiting source electrodes, gate electrodes, and drain electrodes of the switching elements.

2. The radiation detection element of claim 1, wherein the plurality of adjacent pixels are two pixels that are adjacent on both sides of the defect portion.

3. The radiation detection element of claim 1, wherein
    the plurality of parallel lines are provided to commonly apply a predetermine voltage to each pixel in each pixel line along the first direction, and
    the parallel lines that configure the parallel circuit are cut at both sides of a portion that functions as the parallel circuit.

4. The radiation detection element of claim 1, wherein, when the defect is a leak between the scan line and the signal line, the signal line is cut at a portion between a leak portion of the signal line where the leak has occurred and the switching elements of the plurality of adjacent pixels.

5. The radiation detection element of claim 1, wherein
    each pixel includes a storage capacitor that has one electrode connected the parallel line and the other electrode connected to the switching element and that accumulates the generated charges, and
    in the plurality of adjacent pixels, the storage capacitors are short-circuited.

6. The radiation detection element of claim 1, wherein
    each pixel includes a sensor section, that is connected to the parallel line, that has applied thereto a predetermined bias voltage from the parallel line, and that generates charges due to irradiation of radiation, and
    in the plurality of adjacent pixels, the sensor sections are short-circuited.

7. The radiation detection element of claim 1, wherein the pixels are configured such that the parallel line and an electrode of the switching element or at least a portion of a conductive portion connected to the electrode overlap with only an insulating film therebetween.

* * * * *